US011080863B2

(12) United States Patent
Shintani

(10) Patent No.: US 11,080,863 B2
(45) Date of Patent: Aug. 3, 2021

(54) IMAGING APPARATUS, IMAGE PROCESSING DEVICE, AND CONTROL METHOD

(71) Applicant: CANON KABUSHIKI KAISHA, Tokyo (JP)

(72) Inventor: Takuya Shintani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/841,423

(22) Filed: Dec. 14, 2017

(65) Prior Publication Data
US 2018/0182110 A1 Jun. 28, 2018

(30) Foreign Application Priority Data

Dec. 26, 2016 (JP) .............................. JP2016-250486

(51) Int. Cl.
*H04N 5/225* (2006.01)
*G06T 7/246* (2017.01)
(Continued)

(52) U.S. Cl.
CPC ........... *G06T 7/248* (2017.01); *H04N 5/2351* (2013.01); *H04N 5/2357* (2013.01);
(Continued)

(58) Field of Classification Search
USPC ............... 348/169, 226.1, 294, 559; 398/118
See application file for complete search history.

(56) References Cited

U.S. PATENT DOCUMENTS 4,845,557 A * 7/1989 Lang ...................... H04N 5/937
348/559
8,144,213 B2 3/2012 Fuchikami et al.
(Continued)

FOREIGN PATENT DOCUMENTS

JP 08-088855 A 4/1996
JP 2006-317848 A 11/2006
(Continued)

OTHER PUBLICATIONS

The above foreign patent documents were cited in the Aug. 4, 2020 Japanese Office Action, which is enclosed without an English Translation, that issued in Japanese Patent Application No. 2016250486.

*Primary Examiner* — Jayanti K Patel
*Assistant Examiner* — Richard B Carter
(74) *Attorney, Agent, or Firm* — Cowan, Liebowitz & Latman, P.C.

(57) ABSTRACT

An imaging apparatus includes a photometric sensor, and can continuously acquire a plurality of images by a single imaging operation. A CPU for image processing and an arithmetic operation acquires image data output by a photometric sensor and performs photometric processing. The CPU determines presence or absence of a flicker light source using a plurality of pieces of acquired image data, and calculates a motion vector of an object by comparison of image data. If it is determined that there is a flicker light source in a photographing environment, gain adjustment is performed on the basis of a result of flicker detection so as to have a brightness of an image suitable for detection of a motion vector, and the motion vector is calculated using image data after gain adjustment.

13 Claims, 21 Drawing Sheets

(51) Int. Cl.
*H04N 5/243* (2006.01)
*H04N 5/235* (2006.01)
*H04N 5/232* (2006.01)

(52) U.S. Cl.
CPC ..... *H04N 5/23254* (2013.01); *H04N 5/23258* (2013.01); *H04N 5/23261* (2013.01); *H04N 5/243* (2013.01); *H04N 5/23212* (2013.01); *H04N 5/23222* (2013.01)

(56) References Cited

U.S. PATENT DOCUMENTS

| | | |
|---|---|---|
| 9,875,423 B2 | 1/2018 | Miwa |
| 2015/0188632 A1* | 7/2015 | Aoyama ............. H04B 10/116 398/118 |
| 2015/0358570 A1* | 12/2015 | Taniguchi ........... H04N 5/3535 348/294 |
| 2016/0006919 A1* | 1/2016 | Aoyama ................. G01J 1/28 348/226.1 |
| 2016/0249003 A1* | 8/2016 | Miwa ................... H04N 5/2351 |
| 2017/0353660 A1* | 12/2017 | Osawa ................ H04N 5/2351 |

FOREIGN PATENT DOCUMENTS

| | | |
|---|---|---|
| JP | 2016-154285 A | 8/2016 |
| WO | 2009/098741 A1 | 8/2009 |

* cited by examiner

FIG. 12

[FLICKER DETECTION INFORMATION]
○ ACCUMULATION FV START TIME : Ts
○ FLICKER PRESENCE DETERMINATION Flag:TRUE
　・FLICKER CYCLE : 20ms(50Hz)
　・PEAK PHOTOMETRIC VALUE : EV_Fp1
　・PEAK PHOTOMETRIC IMAGE NUMBER : FV4 FV10
○ GAIN TABLE

| Index | Gain name | Gain value |
|---|---|---|
| 1 | G1 | EV_Fp1/EV_Fv 1 |
| 2 | G2 | EV_Fp1/EV_Fv 2 |
| 3 | G3 | EV_Fp1/EV_Fv 3 |
| 4 | G4 | EV_Fp1/EV_Fv 4 |
| 5 | G5 | EV_Fp1/EV_Fv 5 |
| 6 | G6 | EV_Fp1/EV_Fv 6 |
| 7 | G7 | EV_Fp1/EV_Fv 7 |
| 8 | G8 | EV_Fp1/EV_Fv 8 |
| 9 | G9 | EV_Fp1/EV_Fv 9 |
| 10 | G10 | EV_Fp1/EV_Fv 10 |
| 11 | G11 | EV_Fp1/EV_Fv 11 |
| 12 | G12 | EV_Fp1/EV_Fv 12 |

IMAGING APPARATUS, IMAGE PROCESSING DEVICE, AND CONTROL METHOD

BACKGROUND OF THE INVENTION

Field of the Invention

The present invention relates to a technology of detecting brightness under a flicker light source and a technology of detecting a motion amount of an object.

Description of the Related Art

An imaging apparatus such as a single-lens reflex camera performs photometry by processing image signals acquired by a photometric sensor before photographing. A light source such as a fluorescent lamp repeats flickering under an alternating current, a so-called flickering phenomenon occurs, and there is a photographing system which detects a flickering cycle.

On the other hand, in a panning as a photographing technology which expresses a sense of speed of an object (moving object), a photographer performs panning of a camera in accordance with a motion of the object, and aims to capture a still object image and a background-flowing image. If a velocity of panning performed by a photographer in accordance with a motion of the object is not appropriate, there is a difference between a moving velocity of the object and the panning velocity, and blurring may occur in the object image. Therefore, a method of compensating for the difference between a moving velocity of the object and the panning velocity by moving a shift lens of an imaging optical system has been proposed as a technology to assist a user with panning.

In Japanese Patent Laid-Open No. 2006-317848, blurring detection by a gyro sensor and object detection using a motion vector of an image are performed, and a correction amount for positioning a detected object region at a center of the image is calculated. The shift lens moves according to the correction amount, and thereby an operation to assist a follow shot is performed. In addition, as a technology of detecting a motion vector, a method of comparing pixel values of a reference block and a candidate block which are subjected to block matching for detecting a motion vector while shifting a position of the candidate block in a search area has been proposed in Japanese Patent Laid-Open No. H 8-88855.

In the prior art, if a sampling interval of images continuously captured in a photographing situation with a flicker light source is long, and the number of samplings within a certain period of time is small, a detection accuracy in the motion amount of an object may decrease.

SUMMARY OF THE INVENTION

In the present invention, motion amount detection of an object is performed with high accuracy even under a flicker light source.

According to an aspect of the present invention, an imaging apparatus is provided that includes an imaging unit configured to image an object and acquire an image signal; a processing unit configured to perform photometric processing using the image signal; and a detection unit configured to perform detection of a flicker light source and motion detection of the object using a plurality of image signals continuously acquired by the imaging unit, wherein the detection unit has a determination unit configured to determine presence or absence of the flicker light source by detecting a change in brightness of an image and a calculation unit configured to calculate a motion amount of the object.

According to the present invention, it is possible to detect a motion amount of an object with high accuracy even under a flicker light source.

Further features of the present invention will become apparent from the following description of exemplary embodiments (with reference to the attached drawings).

BRIEF DESCRIPTION OF THE DRAWINGS

FIG. 12 is a diagram illustrating an example of flicker detection information of the second embodiment.

DESCRIPTION OF THE EMBODIMENTS

Figure 1:
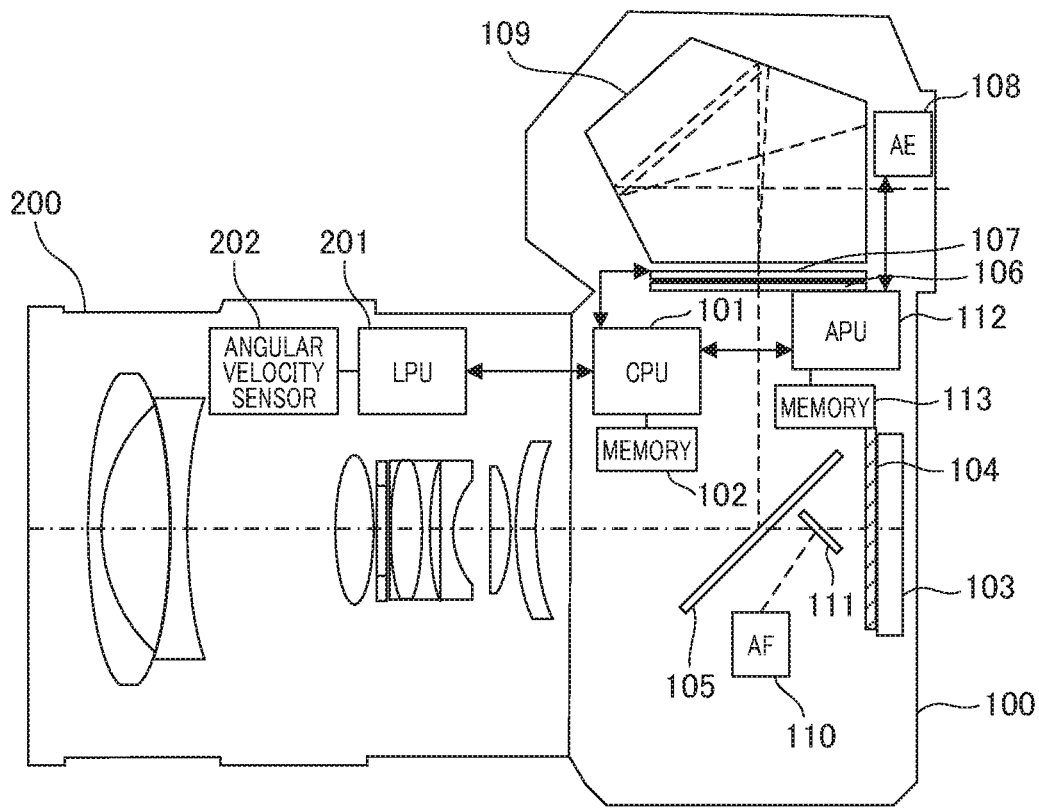
FIG. 1 is a diagram illustrating a configuration example of a camera system according to an embodiment of the present invention.

Hereinafter, preferred embodiments of the present invention will be described in detail with reference to accompanying drawings. First, an outline of the present invention will be described. If the sampling interval of images continuously captured by an imaging apparatus is long and the number of samplings within a certain period of time is small, there is a problem in accuracy of motion vector detection. If the motion of an object is great, it is necessary to increase a comparison area between a reference block and a candidate block in the continuously captured images. However, too much increase in the comparison area causes a processing time of motion vector detection to be long, and thus there to be a possibility of processing lacking a real-time property.

Therefore, increasing the number of samplings of a captured image for motion vector detection may be considered. In this case, in a photometric sensor provided in a pentaprism portion, for example, there is a concern that a resolution of imaging processing for photometry and flicker detection may be lowered and there may be a problem that photometry accuracy and flicker detection accuracy will be lowered. If motion vector detection is performed by using a captured image for photometry, there is a problem that a first exposure time of imaging suitable for photometry differs from a second exposure time of imaging suitable for the motion vector detection. The first exposure time is an accumulation time required for performing photometry with high accuracy using an imaging element. In a photometric operation, it is necessary to use a captured image with a certain degree of brightness. For this reason, the first exposure time may diverge from the second exposure time if an accumulation time for an image signal (electric charge) becomes long. That is, a long accumulation time may cause image blurring of the object to increase, and thus this is not suitable for a purpose of accurately performing motion vector detection.

If motion vector detection is performed using a captured image used for flicker detection, the second exposure time is shortened in the flicker detection, and the presence or absence of a flickering phenomenon is determined by detecting light and shade of an image under a flicker light source. For this reason, it is possible to obtain an image suitable for a purpose in a respect that image blurring of the object hardly occurs due to a short accumulation time of an image signal even in a motion vector detection. However, continuous images with different brightnesses are acquired due to differences in the light and shade occurring under a flicker light source in the motion vector detection. Therefore, it is difficult to detect a motion vector of the object which is a moving object using a plurality of captured images with contrast differences.

In embodiments of the present invention, photometric processing is performed using an image signal from a photometric sensor, and processing for detection of a flicker light source and motion detection of the object using a plurality of continuously acquired image signals will be described. Subsequent to a photometric operation based on an output of a photometric sensor which is an imaging unit, flicker detection and motion detection of the object are performed. A sampling interval for image acquisition is shortened in motion detection, and thereby a motion amount of the object even under a flicker light source can be acquired with high accuracy. In the following, a single-lens reflex camera is illustrated as the imaging apparatus, and a system in which the motion vector of the object can be calculated while an effect of the flickering phenomenon is taken into account will be described. A digital camera having a function (panning assist) of supporting a follow shot of a user is illustrated, but the present invention is also applicable to the imaging apparatus not having this function.

FIG. 1 is a diagram which shows a configuration example of a camera system according to an embodiment of the present invention. A user can use a camera main body 100 with a lens device 200 attached thereto. A camera control unit 101 has a central processing unit (CPU) for controlling each portion of the camera main body 100. A memory 102 is a random access memory (RAM), a read only memory (ROM), or the like connected to the camera control unit 101.

An imaging unit 103 includes an optical member such as an infrared cut filter and a low pass filter, and an imaging element. The imaging element is a charge coupled device (CCD) type image sensor, a complementary metal oxide semiconductor (CMOS) type image sensor, or the like. An image of the object is formed by a lens device 200 at the time of photographing, and an imaging element outputs an electrical signal by photoelectric conversion. A shutter 104 light-shields an imaging element at the time of non-photographing, and opens at the time of photographing to guide light rays to an imaging element. A half mirror 105 is an optical member which reflects a portion of light incident from the lens device 200 and forms an image on a focusing plate 106.

The display element 107 displays a focus detection frame for auto-focus (AF). A display of the focus detection frame can be presented to a user in which position AF processing is performed when the user looks into an optical finder. The display element 107 is a display device using a PN (polymer network) liquid crystal. An arrangement example of focus detection frames will be described with reference to FIG. 2.

Figure 2:
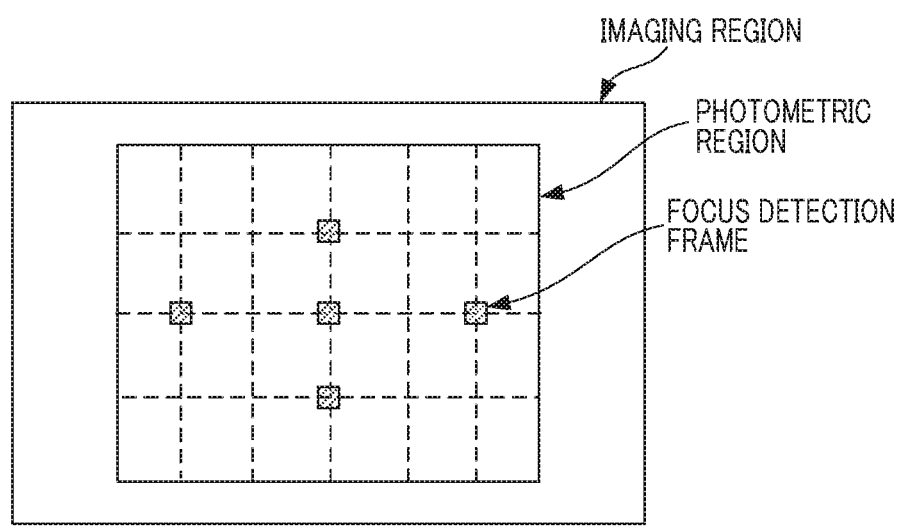
FIG. 2 is a diagram illustrating an arrangement example of focus detection frames.

FIG. 2 shows a state in which a plurality of focus detection frames are displayed in the display element 107 using a PN liquid crystal. In the PN liquid crystal, a liquid crystal of a focus detection frame selected by an instruction from the camera control unit 101 spreads and a focus detection frame is displayed. In a photometric region in an imaging region, boundary lines between a plurality of separate block regions are indicated by dotted lines. That is, the photometric region is divided into a predetermined number of block regions, and focus detection frames are positioned at intersections of intersecting boundary lines.

An imaging element such as a CCD sensor or a CMOS sensor is used in the photometric sensor 108 of FIG. 1. The photometric sensor 108 is used not only for photometry but also for detection of a motion vector to be described below. The pentaprism 109 guides the object image of the focusing plate 106 to the photometric sensor 108 and an optical finder. The photometric sensor 108 is disposed at a position at which the object image formed on the focusing plate 106 may be seen from an oblique direction via the pentaprism.

An AF mirror 111 is an optical member which guides a portion of light rays incident onto the camera main body 100 from the lens device 200 and passing through the half mirror 105 to a focus detection unit 110. The focus detection unit 110 has a focus detection circuit and performs processing for detecting a focus detection state.

An arithmetic operation unit 112 is a CPU (hereinafter, referred to as APU) for image processing which processes an output signal of the photometric sensor 108 and an arithmetic operation. The APU 112 performs an arithmetic operation of tracking or an arithmetic operation of face detection of a object, a photometry arithmetic operation, a flicker detection arithmetic operation, a motion vector detection arithmetic operation, and the like. In addition, the APU 112 includes a gain circuit for performing gain processing on an image signal, an addition circuit of an image signal, and a clocking timer which acquires time information. A memory 113 is a RAM, a ROM, or the like connected to the APU 112.

The APU 112 stores information to be referred to. In the present embodiment, an example in which an arithmetic operation unit dedicated to a photometric sensor is used is described, but processing may be performed using only a CPU of the camera control unit 101.

The lens device 200 includes a lens control unit 201 (hereinafter, referred to as LPU), and controls each unit in the lens device 200. The LPU 201 can communicate with the camera control unit 101, and transmit distance information of the object, angular velocity information of deflection, and the like to the camera control unit 101. The angular velocity sensor 202 is an angular velocity sensor such as a gyro sensor. The angular velocity sensor 202 detects an angular velocity representing deflection or the like applied to the lens device 200, converts the angular velocity into an electrical signal and outputs the signal to the LPU 201. The LPU 201 acquires a deflection detection signal detected by the angular velocity sensor 202 and performs a drive control of a correction lens (shift lens) constituting an imaging optical system. Accordingly, an image blurring correction operation to optically correct image blurring of the object is performed. In addition, when the imaging apparatus has a function (panning assist) to support a follow shot of a user, the camera control unit 101 transmits information indicating that control has been switched to a panning assist control to the LPU 201. In a panning assist mode, the LPU 201 performs a movement control of a shift lens according to a control signal from the camera control unit 101 and performs a control to reduce a difference between a moving velocity of the object and a panning velocity. The panning assist is a known technology, and thus detailed description thereof will be omitted.

An operating member (photographing button) for photographing is provided in the camera main body 100, and a photometry operation is performed by a user operating the operating member. With this operating member, the photometry operation is started in a first state (ON state of SW1) in accordance with an operation of a user, and a photographing operation is performed in a second state (ON state of SW2) in which an operation amount is larger than in the first state.

First Embodiment

Figure 3:
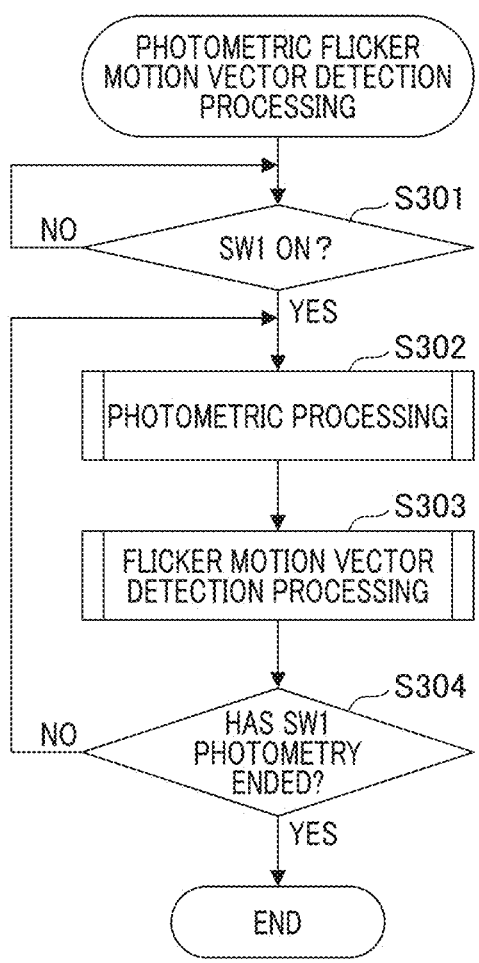
FIG. 3 is a flowchart illustrating photometric flicker motion vector detection processing of a first embodiment.

Hereinafter, a first embodiment of the present invention will be described. FIG. 3 is a flowchart of photometric flicker motion vector detection processing in the present embodiment. The following processing is realized by a CPU of the camera control unit 101 and the APU 112 reading a program from a memory and executing the program. First, in S301, a user operates a photographing button, and processing for determining whether an ON state of SW1 is detected is performed. If it is determined that SW1 is in an ON state, the procedure proceeds to processing of S302. If it is determined that SW1 is not in an ON state, determination processing of S301 is repeated.

In S302, photometric processing for determining an exposure at the time of photographing is executed. The photometric processing will be described using a flowchart of FIG. 4. Next, in S303, flicker motion vector detection processing is executed. Processing for detecting whether a object is under a flicker light source and processing for detecting a motion vector of the object are performed. The details of each processing will be described using flowcharts of FIGS. 5 and 6.

Next, in S304, an operation of the photographing button ends and processing for determining whether the ON state of SW1 is released is performed. If the ON state of SW1 is released, processing ends, and, if it is determined that the ON state is not released, the procedure returns to the processing of S302 and the processing continues. The detection processing according to the present embodiment will be described with reference to FIGS. 7 to 9 with specific examples.

The photometric processing of S302 of FIG. 3 will be described with reference to the flowchart of FIG. 4. Accumulation A processing is executed in S401. The accumulation A processing is processing in which the photometric sensor 108 accumulates image signals of the object guided by the pentaprism 109 and the focusing plate 106 over a predetermined time. The predetermined time is an accumulation time (exposure time) required to accurately measure brightness with the photometric sensor 108, and follows a predetermined program diagram. The program diagram is a known technology, and thus detailed description thereof will be omitted.

Next, read A processing is executed in S402. The read A processing is processing for reading an image signal corresponding to an electric charge accumulated in S401 and holding it in the memory 113. In a next S403, photometry arithmetic processing is executed. The photometry arithmetic processing is performed on the basis of an image for exposure determination (hereinafter, referred to as a photometric image A) held in the memory 113 in S402, and a brightness of a region subjected to photometry is measured. A photometric region is divided into a predetermined number of block regions, a brightness of each block is measured, and arithmetic processing is performed, and thereby it is possible to measure a brightness of an entire image. Since an algorithm of the photometric arithmetic processing is not directly related to features of the present invention, description thereof will be omitted.

Figure 5:
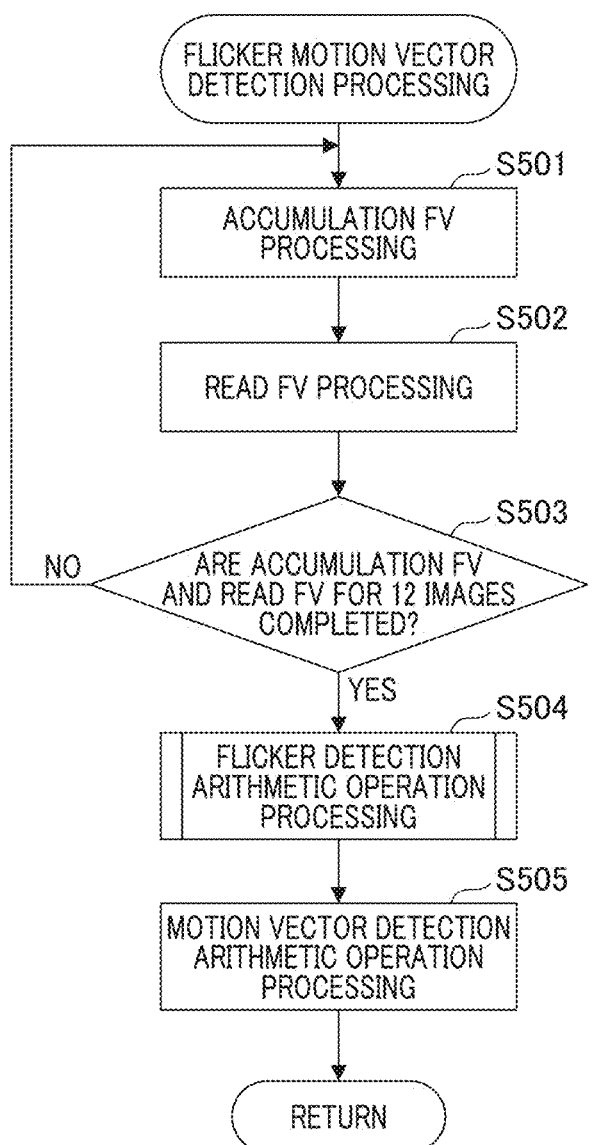
FIG. 5 is a flowchart illustrating flicker motion vector detection processing of the first embodiment.

The flicker motion vector detection processing of S303 of FIG. 3 will be described with reference to a flowchart of FIG. 5. In S501, accumulation FV processing is performed for flicker detection and motion vector detection. The accumulation FV processing is processing in which the photometric sensor 108 accumulates object images guided by the pentaprism 109 and the focusing plate 106 of FIG. 1 over a predetermined time. The predetermined time is a time for determining a flickering cycle of a flickering phenomenon in which flickering is repeated with an alternating current and shortening a sampling interval of motion vector detection to acquire the object without blurring with high accuracy. Specifically, an accumulation FV setting time for flicker detection and motion vector detection (hereinafter, referred to as an FVT) is set to 1.66 milliseconds. The details will be described with reference to FIGS. 7 to 9. The APU 112 has a timer for acquiring time information and acquires time data based on an accumulation start time. Each piece of data acquired from first time data Ts1, second time data Ts2, and third time data Ts3 is held in the memory 113.

Next, read FV processing is performed in S502. The read FV processing is processing for reading image signals accumulated in S501 and holding the signals in the memory 113. Processing of S503 is processing for determining whether a predetermined number of images have been acquired. For example, it is determined whether 12 continuous images (hereinafter, referred to as photometric images FV) have been acquired by the accumulation FV processing and the read FV processing. Details of the photometric image FV will be described with reference to FIGS. 7 to 9. If it is determined that a predetermined number of photometric images FV have not been captured in S503, the procedure returns to S501 and the processing continues. On the other hand, if it is determined that a predetermined number of photometric images FV have been captured, the procedure proceeds to processing of S504.

Flicker detection arithmetic processing is executed in S504. The presence or absence of flickering is determined based on a predetermined number of photometric images FV held in the memory 113 in S501 and S502. The flicker detection arithmetic processing will be described with reference to FIG. 6. Next, motion vector detection arithmetic processing is executed in S505. A motion vector is calculated based on a predetermined number of photometric images FV held in the memory 113 in S501 and S502. Specifically, block pattern matching processing for comparing a total of 12 continuously captured photometric images FV is performed, but it is a known technology, and therefore, detailed description thereof will be omitted. In the motion vector detection (referred to as motion detection) arithmetic processing, processing for determining presence or absence of motion of the object and processing for calculating a motion amount of the object (moving object) are performed. The calculated motion amount is used for control of panning assist, control of electronic image blurring correction, auto-zoom control which automatically adjusts an angle of view by detecting motion of the object, or the like. A result of the motion detection of the object can be used for arbitrary control. If processing of S505 ends, the procedure returns to proceed the processing.

Figure 6:
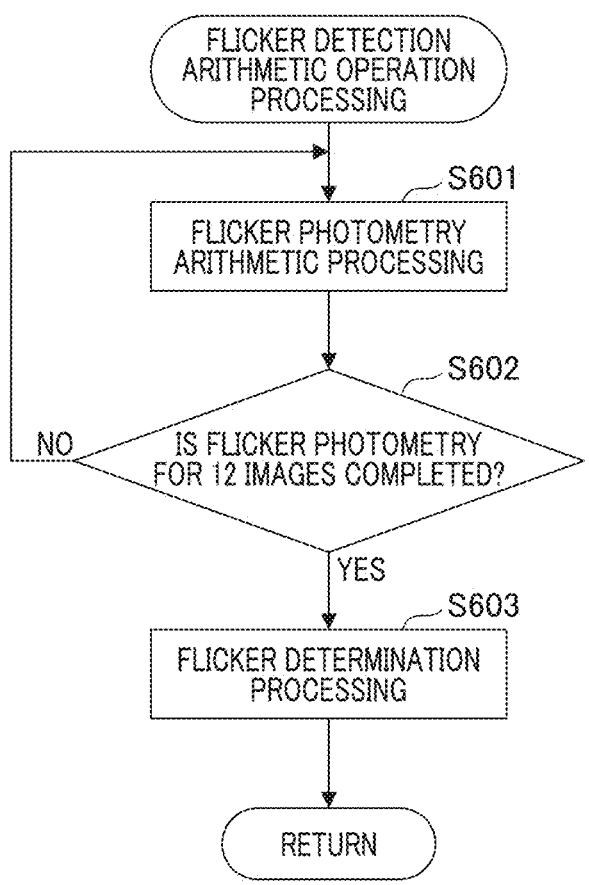
FIG. 6 is a flowchart illustrating flicker detection arithmetic processing in the first embodiment.

The flicker detection arithmetic processing of S504 of FIG. 5 will be described with reference to a flowchart of FIG. 6. First, flicker photometry arithmetic processing is performed in S601. That is, photometry arithmetic processing is executed using data of the photometric image FV held in the memory 113. Since the algorithm of the photometry arithmetic processing is not directly related to the features of the present invention, description thereof will be omitted. The following S602 is processing for determining whether the flicker photometry arithmetic processing on a predetermined number of images is completed. It is determined whether the flicker photometry arithmetic processing is completed using 12 photometric images FV, and if it is determined that the processing is not completed, the procedure returns to S601 and continues the processing. On the other hand, if it is determined that the flicker photometry arithmetic processing is completed, the procedure proceeds to processing of S603.

In S603, flicker determination processing is performed. The flicker determination processing is processing for determining whether a photographing situation is under a flicker light source on the basis of a photometry result of a predetermined number of images on which the flicker photometry arithmetic operation is performed in S601. Details of determination processing are described with reference to FIGS. 9A to 9C, but it is possible to determine whether a photographing situation is under a flicker light source by comparing photometric values (EV_Fv) from a plurality of photometric images FV continuously captured at predetermined time intervals FVT. If a photographing situation is under a flicker light source, a peak of flickering of the flicker light source and a cycle thereof are determined. If the processing of S603 ends, the procedure returns to proceed the processing.

Figure 7:
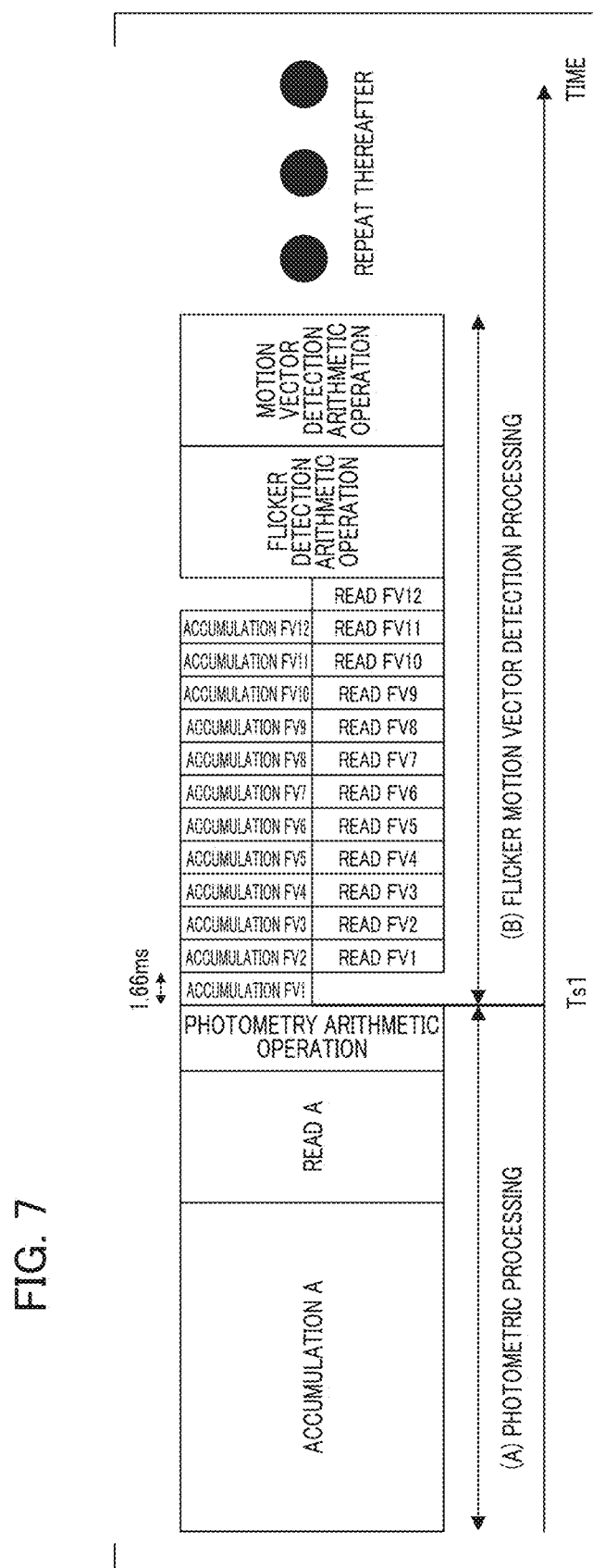
FIG. 7 is a diagram illustrating the photometric flicker motion vector detection processing of the first embodiment.

FIG. 7 is a timing chart for describing a sequence of photometric processing, flicker detection and motion vector detection processing in the present embodiment. A horizontal axis is a time axis. Ts1 represents the first time data and a period up to Ts1 is a period of (A) photometric processing. A period after Ts1 is a period of (B) flicker motion vector detection processing.

In a period of (A) photometric processing, read A processing is performed after accumulation A processing is performed at any accumulation time according to a program diagram. Photometry arithmetic processing is performed using data of a read image (photometric image A). Thereafter, in the period of (B) flicker motion vector detection processing, accumulation FV processing is repeatedly executed at predetermined time intervals FVT from Ts1 corresponding to the accumulation start time. 12 instances of accumulation FV is expressed as "accumulation FV1 to FV12", and read FVs corresponding to the accumulation FVs are expressed as "read FV1 to FV12". In the present embodiment, an accumulation FVj (j=1 to 11) ends, and at the same time a read FVj and a next accumulation FVj+1 are executed in parallel. Accordingly, it is possible to avoid a loss in continuity of captured images.

If an accumulation FV12 ends, flicker detection arithmetic processing is performed after a read FV12 is performed. In general, a cycle of the flicker light source is a cycle corresponding to one of commercial alternating current power source frequencies 50 Hz and 60 Hz. For example, if the accumulation time is set to 1.66 milliseconds, the number of photometric images captured within 10 milliseconds is six. That is, a photometry arithmetic operation is performed by acquiring six photometric images and a change in brightness in a photometry range is determined, and thereby it is possible to detect presence or absence of a flicker and a peak of a light source in the case of either of 50 Hz and 60 Hz. It is possible to detect presence or absence of a flicker and a peak of the brightness of a light source in the remaining six photometric images in the same manner. A flickering cycle of the flicker light source can be determined based on time intervals of two detected peaks. Details thereof will be described with reference to FIGS. 9A to 9C.

If the flicker detection arithmetic processing ends, motion vector detection arithmetic processing is performed using 12 continuously captured photometric images FV. For example, if continuous imaging is performed for a relatively short period of time such as 1.66 milliseconds of accumulation time in the accumulation FV, a movement amount of the object region including image blurring in the photometric image FV is small. For this reason, it is possible to reduce a size of a comparison area for comparing a reference block with a candidate block in continuously captured images, to shorten a processing time and to perform motion detection of the object with high accuracy. The above processing is repeatedly executed even after the second time data Ts2.

FIGS. 8A to 8C are diagrams which show brightness of the photometric image FV, photometric values EV_Fv1 to EV_Fv12 of each of the photometric images FV1 to EV_Fv12, and corresponding image examples if a photographing situation is not under a flicker light source. In the period of (B) flicker motion vector detection processing of FIG. 7, the brightness of a photometric image shown in FIG. 8A is constant in a photographing situation which is not under a flicker light source. The vertical axis of FIG. 8A represents the brightness and the horizontal axis represents a time axis. Since this is not under a flicker light source, the brightness is shown as a constant value EV_A1 regardless of an elapse of time.

FIG. 8B shows a predetermined number of photometric images FV continuously captured with the accumulation FV and the read FV (FIG. 7) and photometric values EV_Fv thereof, respectively, in photographing conditions of FIG.

8A. In this case, since there is constant brightness EV_A1, it is determined that there is no contrast difference in 12 continuous photometric images FV when comparing a plurality of photometric values EV_Fv. FIG. 8C is a schematic diagram which exemplifies object images of a moving object in a captured image. Only a photometric image FV1 and a photometric image FV2 are representatively shown. This shows that the object region in the photometric image FV1 moves to a position indicated by a solid line in the photometric image FV2 captured after a time of 1.66 milliseconds has elapsed.

If motion detection of the object is performed in a photographing environment in which the brightness does not significantly change, a contrast difference in a comparison area is small, and thus it is generally easy to compare image regions. That is, object regions in continuous photometric images can be clearly compared, and thus motion detection accuracy is high. In addition, if motion detection is performed by the photometric images FV captured at short time intervals of 1.66 milliseconds, a movement distance of the object region between images to be compared becomes small, and thus it is possible to decrease a size of the comparison area.

FIGS. 9A to 9C are diagram which show brightnesses of the photometric images FV, the photometric images FV1 to FV12, respective photometric value EV_Fv1 to FV12, and corresponding image examples in a photographing situation under a flicker light source. Since FIGS. 9A to 9C correspond to FIGS. 8A to 8C, only differences therefrom will be described. FIGS. 9A to 9C illustrate photographing under a flicker light source which repeats flickering with a half of a cycle corresponding to 50 Hz. A peak of the brightness shown in FIG. 9A is represented as EV_Fp1.

FIG. 9B shows the photometric images FV1 to FV12 and the photometric values EV_Fv1 to EV_Fv12 continuously captured with the accumulation FV and the read FV at every 1.66 milliseconds in the photographing conditions under a flicker light source. In this case, due to an effect of the flicker light source, there is a contrast difference in the six images which are photometric images FV1 to FV6. The contrast difference in these images can be detected by comparing photometric values EV_Fv1 to EV_Fv6, and EV_Fp1 is calculated from a photometric value EV_Fv4 of a photometric image FV4. That is, it is determined that the peak EV_Fp1 of the flicker light source is in the photometric image FV4 by comparison between respective photometric values EV_Fv1 to EV_Fv6. In the same manner, the contrast difference in six images of photometric images FV7 to FV12 is detected. By comparing respective photometric values EV_Fv7 to EV_Fv12, it is determined that a second peak EV_Fp1 is in a photometric image FV10. Since the accumulation time is set to 1.66 ms and the peaks EV_Fp1 are in the photometric image FV4 and the photometric image FV10, it is determined that a difference (time difference) between two peaks is 10 milliseconds. In other words, a determination result is that there is a cycle corresponding to a frequency of the flicker light source of 50 Hz.

Figure 8:
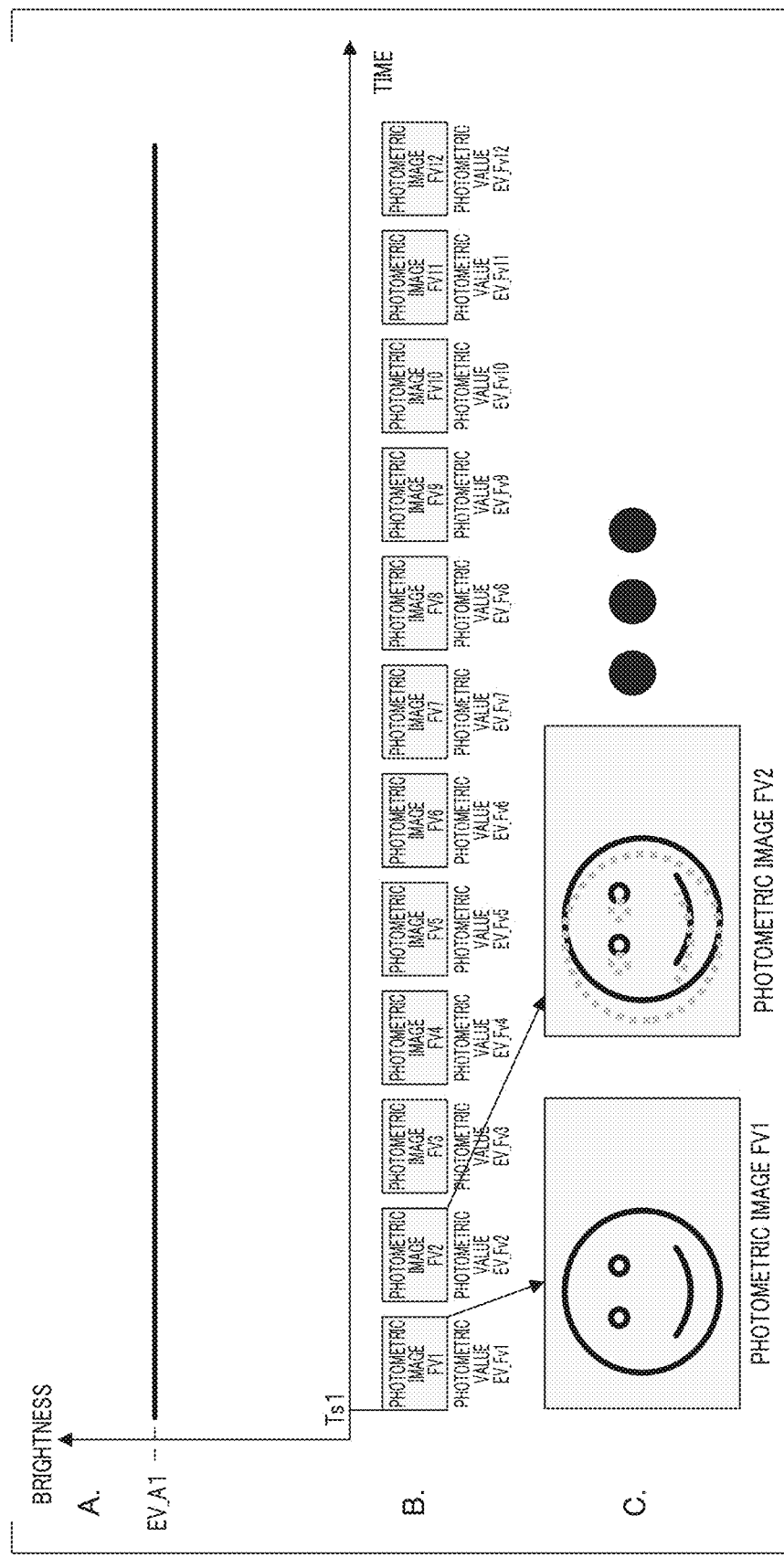
FIG. 8 is a diagram illustrating a photographing situation which is not under a flicker light source in the first embodiment.
Figure 9:
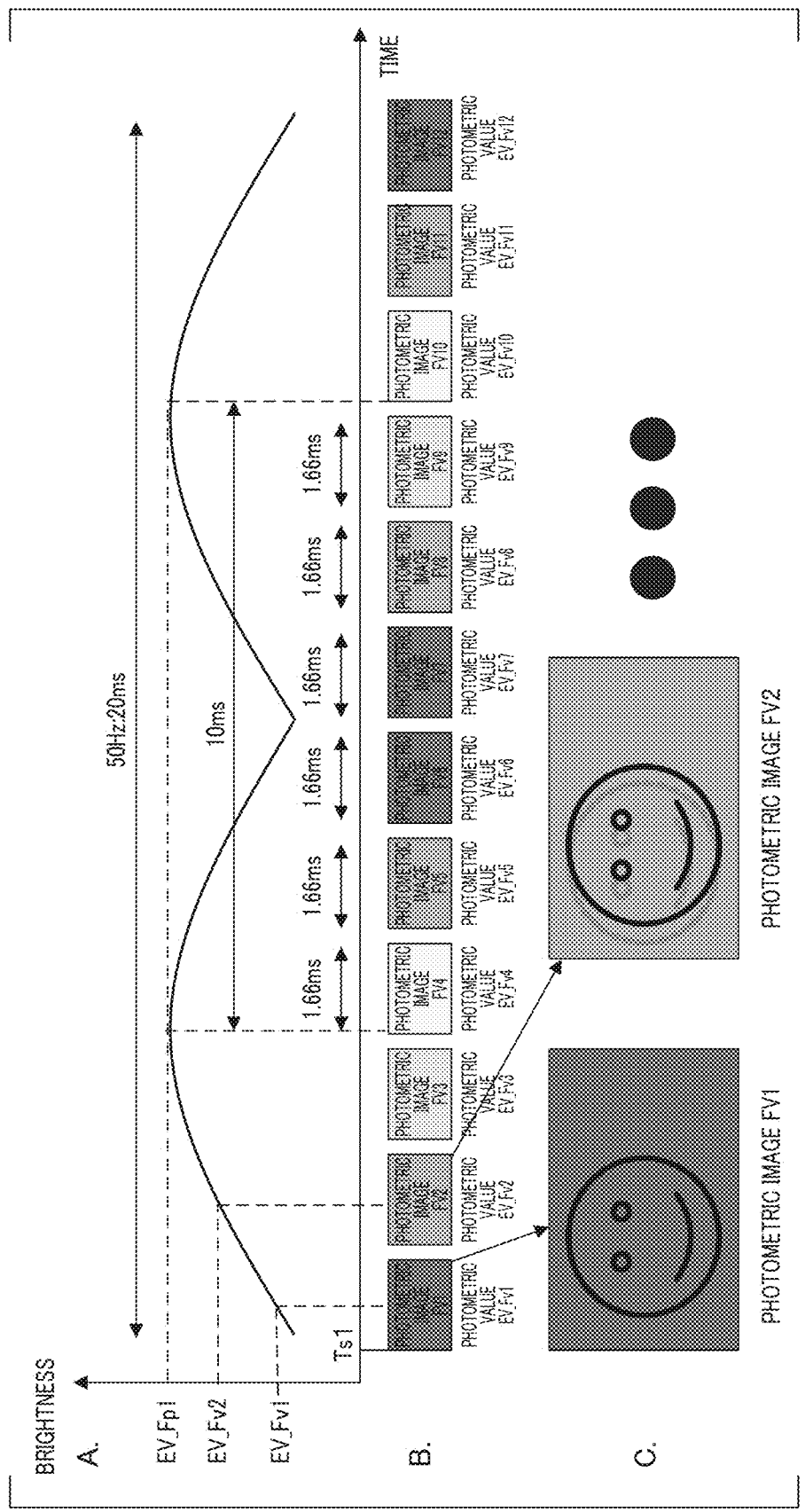
FIG. 9 is a diagram illustrating a photographing situation which is under a flicker light source in the first embodiment.

If a photometric image FV1 exemplified in FIG. 9C is compared with a photometric image FV2, the photometric image FV2 is a brighter image than the photometric image FV1. The object region in the photometric image FV1 moves to a position shown by a solid line in the photometric image FV2 after an elapse of 1.66 milliseconds. If motion detection of the object whose brightness changes is performed under a flicker light source whose brightness greatly changes, detection accuracy may decrease. That is, compared to a photographing situation not under a flicker light source as shown in FIG. 8, if there is light and shade in an object in a comparison area between images, it is difficult to clearly compare image regions. With regard to a problem that motion detection accuracy decreases under a flicker light source, a solution is described in a second embodiment.

In the present embodiment, using images continuously captured within a short exposure time for flicker detection and motion vector detection processing, these two types of detection processing are continuously executed. It is possible to perform motion detection processing without a decrease in resolution by appropriately setting a time interval for performing photometry and flicker detection. According to the present embodiment, it is possible to provide an imaging apparatus which shortens a sampling interval of motion vector detection and performs motion detection with high accuracy even under a flicker light source in an imaging operation using a photometric sensor.

Second Embodiment

A second embodiment of the present invention will be described. In the present embodiment, processing for performing motion detection with high accuracy under a flicker light source by using flicker detection information in response to a decrease in motion detection accuracy under a flicker light source will be described. Description of material the same as in the first embodiment will be omitted and differences will be mainly described in the present embodiment. A method of omitting such description is also the same as in embodiments described below.

Flicker motion vector detection processing (S303 of FIG. 3) of the present embodiment will be described with reference to a flowchart of FIG. 10. In S1001, accumulation FV processing is performed in the same manner as in S501 of FIG. 5. Time information (Ts1, Ts2, Ts3, and the like) is held in the memory 113 due to a timer for measuring time. In S1002, read FV processing is performed in the same manner as in S502 of FIG. 5.

In S1003, previous flicker detection information use processing which is a feature of the present embodiment is performed. This processing is processing for generating a photometric image Vg from the photometric image FV using previous flicker detection information. Details thereof will be described with reference to a flowchart of FIG. 13. S1004 is processing for determining whether the photometric image Vg has been generated by previous flicker detection information use processing with respect to 12 continuously captured photometric images FV. If it is determined that 12 photometric images FV have not been captured and the photometric image Vg has not been generated, the procedure returns to S1001 and the processing is repeated. On the other hand, if it is determined that 12 photometric images FV have been imaged and the photometric image Vg has been generated, the procedure proceeds to the processing of S1005.

In S1005, flicker detection arithmetic processing is performed. In S1001 and S1002, processing for determining whether a flicker light source is present in a photographing environment is performed based on 12 photometric images FV held in the memory 113. Details thereof will be described with reference to FIG. 11. Next, in S1006, motion vector detection arithmetic processing is executed. Arithmetic processing for calculating a motion vector from a photometric image Vg generated by applying previous flicker information is performed with respect to the 12 photometric images FV held in the memory 113. For example, block pattern matching may be used for comparing a total of 12 continuously captured photometric images Vg. Since a processing method is a known technology, details thereof will be omitted.

Figure 11:
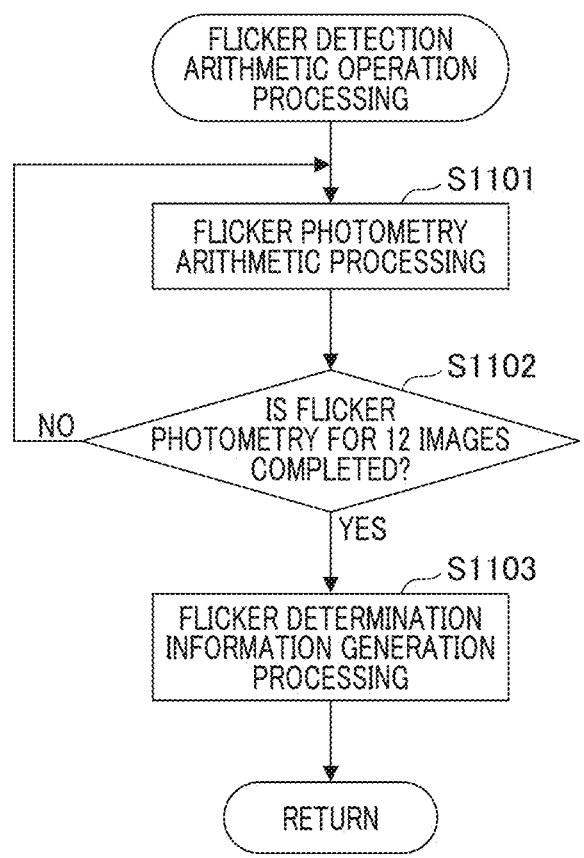
FIG. 11 is a flowchart illustrating flicker detection arithmetic processing in the second embodiment.

The flicker detection arithmetic processing will be described with reference to a flowchart of FIG. 11. Since processing of S1101 and S1102 is the same processing as in S601 and S602 of FIG. 6, description thereof will be omitted and S1103 will be described. In S1103, flicker detection information generation processing is performed. Flicker detection information is generated based on photometry results from 12 photometric images FV subjected to an arithmetic operation in S1101. Details of flicker determination processing are described in FIGS. 9A to 9C. Flicker detection information will be described using a specific example of FIG. 12.

FIG. 12 is a diagram which represents an example of flicker detection information under the conditions described in FIGS. 9A to 9C. An accumulation FV start time Ts is, for example, the accumulation start time Ts1 held in S1001 of FIG. 10. A flicker presence determination Flag is a flag which indicates a result of determining presence or absence of a flicker by flicker photometry. TRUE indicates a determination result that a flicker is present, and FALSE indicates a determination result that a flicker is not present. A flicker cycle indicates a cycle of a flickering phenomenon if it is determined that a flicker light source is present in a photographing environment (in a case of TRUE). If it is determined that a flicker light source is not present (in a case of FALSE), a flicker cycle becomes an invalid value. A peak photometric value EV_Fp1 indicates a peak of a photometric value if it is determined that a flicker light source is present in a photographing environment. If it is determined that a flicker light source is present, a peak photometric image number indicates an order of the peak photometric values of the photometric images FV and an order of an image, and if it is determined that a flicker light source is not present, a peak photometric image number is an invalid value. A gain table is a data group representing a ratio (EV_Fp1/Ev_Fv) of each photometric value of the photometric images FV1 to FV12 to a peak photometric value EV_Fp1. This is a data table which is a gain table indicating how much gain has to be applied to each photometric value in order for it to have the same brightness as EV_Fp1. In the gain table, an index specifying each of the photometric images FV1 to FV12 is allocated and a gain name and a gain value are referred to using the index.

Previous flicker detection information use processing will be described with reference to a flowchart of FIG. 13. In S1301, the flicker detection information previously acquired is referred to and the flicker presence determination Flag is determined. If it is determined that the flicker presence determination Flag is TRUE, the procedure proceeds to processing of S1303, and, if it is determined that the flicker presence determination Flag is FALSE, the procedure proceeds to processing of S1302.

In S1302, one-times gain table selection processing for selecting a one-times gain table for the photometric images FV is performed. The one-times gain table is a gain table for generating the photometric images FV as photometric images Vg without multiplying the photometric images FV by a gain (a gain value is set to one times). In this case, since there is no need to correct a contrast difference due to a flickering phenomenon by gain adjustment, a gain value for each photometric image FV is one. If this processing is the first instance thereof, that is, if flicker detection information is not present, it is determined that a flicker presence determination Flag is not TRUE. Next, the procedure proceeds to processing of S1305.

Figure 10:
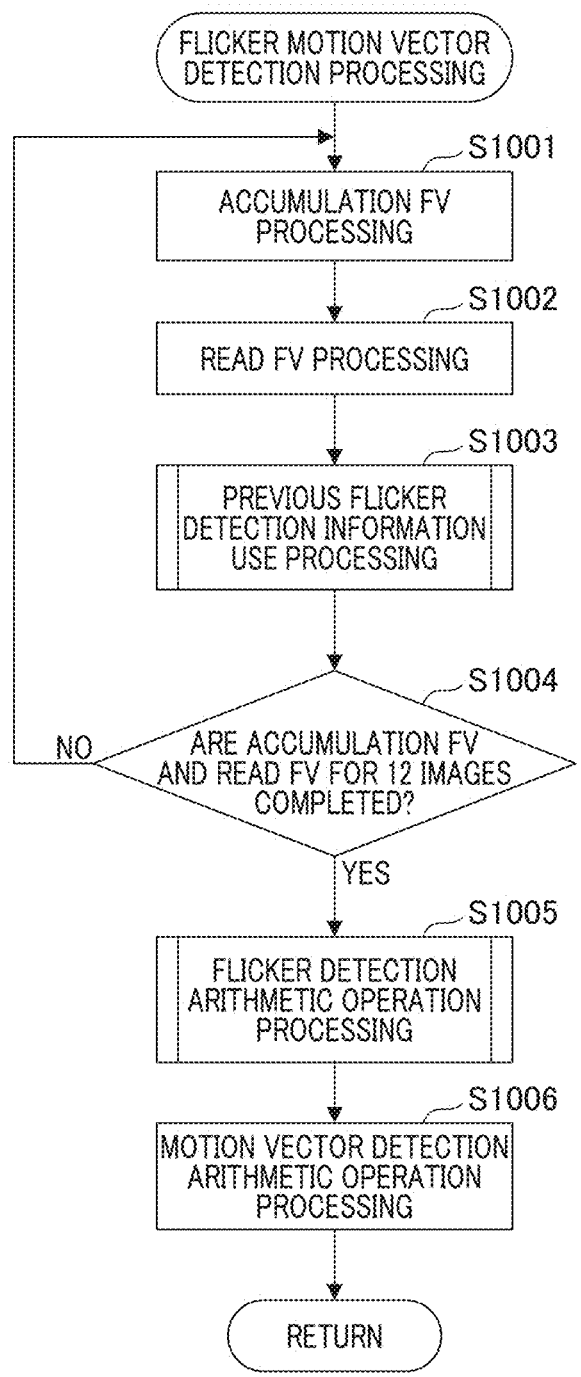
FIG. 10 is a flowchart illustrating flicker motion vector detection processing of a second embodiment.

S1303 is processing for determining whether an image of the accumulation FV and the read FV among the photometric images FV in S1001 and S1002 of FIG. 10 is a first image. If it is determined that it is not a first image, the procedure proceeds to processing of S1305. In addition, if it is determined that it is a first image, the procedure proceeds to processing of S1304.

In S1304, processing for determining from which index of the gain table of previous flicker detection information to select a gain is performed. In the present processing, as shown in the following Expression (1), an arithmetic operation of subtracting time information Ts included in the flicker detection information from the time information Ts1 held in S1001 of FIG. 10, and dividing a result by a flicker cycle to calculate a remainder is performed.

$(Ts1-Ts)/\text{flicker cycle} = \text{quotient}(Sh) + \text{remainder}(Am)$  Expression (1)

According to the following Expression (2), the remainder Am is divided by an accumulation time 1.66 (milliseconds).

$Am/1.66 = \text{quotient}(Sh2) + \text{remainder}(Am2)$  Expression (2)

According to the following Expression (3), one is added to the calculated quotient Sh2.

$\text{Index} = Sh2 + 1$  Equation (3)

The result is an index of a gain table of previous flicker detection information.

Figure 4:
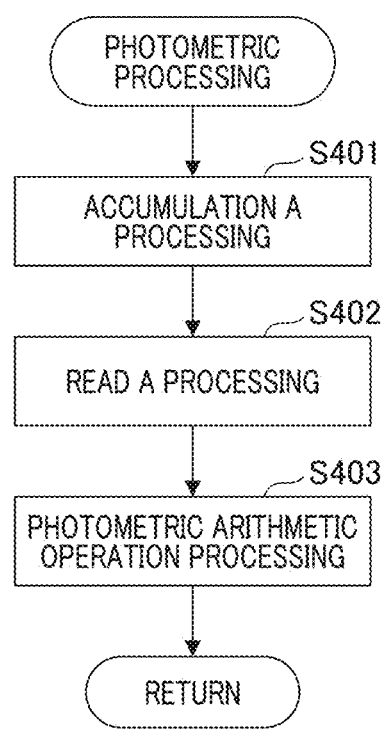
FIG. 4 is a flowchart illustrating photometric processing in the first embodiment.
Figure 15:
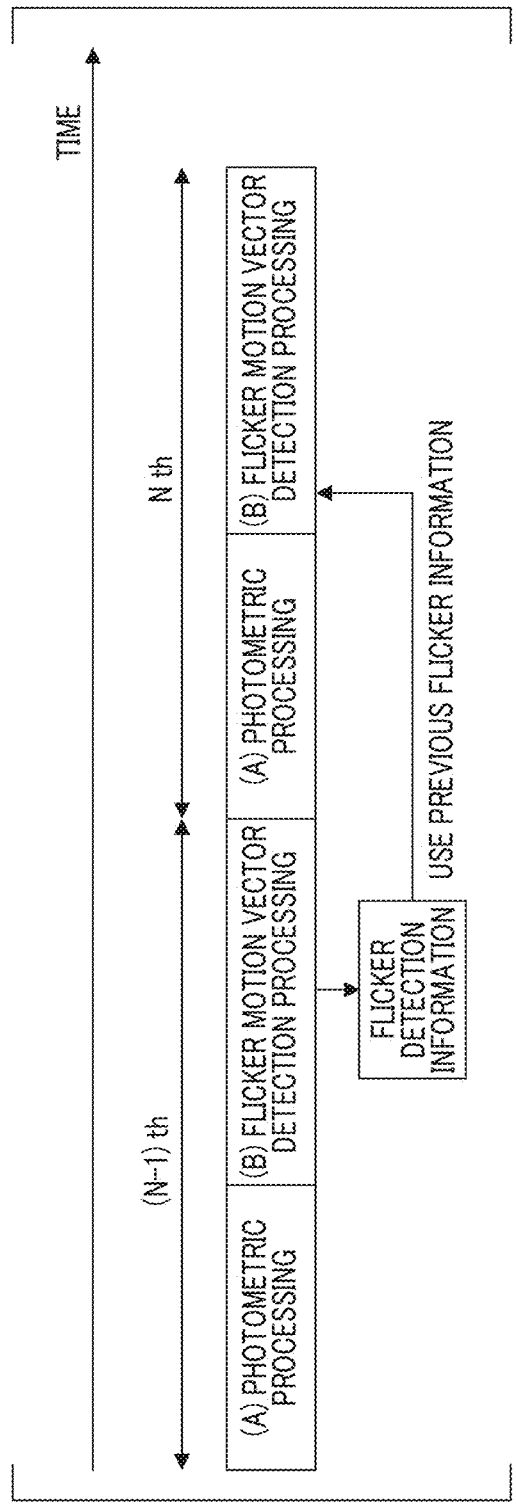
FIG. 15 is a diagram illustrating a photometric image generation processing using the previous flicker detection information.

FIG. 4 is a diagram which shows an illustration of the arithmetic operation described above, and exemplifies a temporal relationship between (N−1)th and Nth gain tables. For example, if a quotient Sh2 obtained by dividing the remainder Am by 1.66 milliseconds is set to three, reference to a gain table is sequentially performed from a position of Index4 at the time of Ts1. FIG. 15 is a diagram which describes a processing sequence. If photometric flicker motion vector detection processing of the present embodiment is repeatedly performed, flicker detection information from the flicker detection arithmetic processing of S1005 of FIG. 10 is held in the memory 113 at the time of (N−1)th detection processing. Accordingly, it is possible to generate a photometric image Vg from a photometric image FV captured by Nth detection processing.

Figure 13:
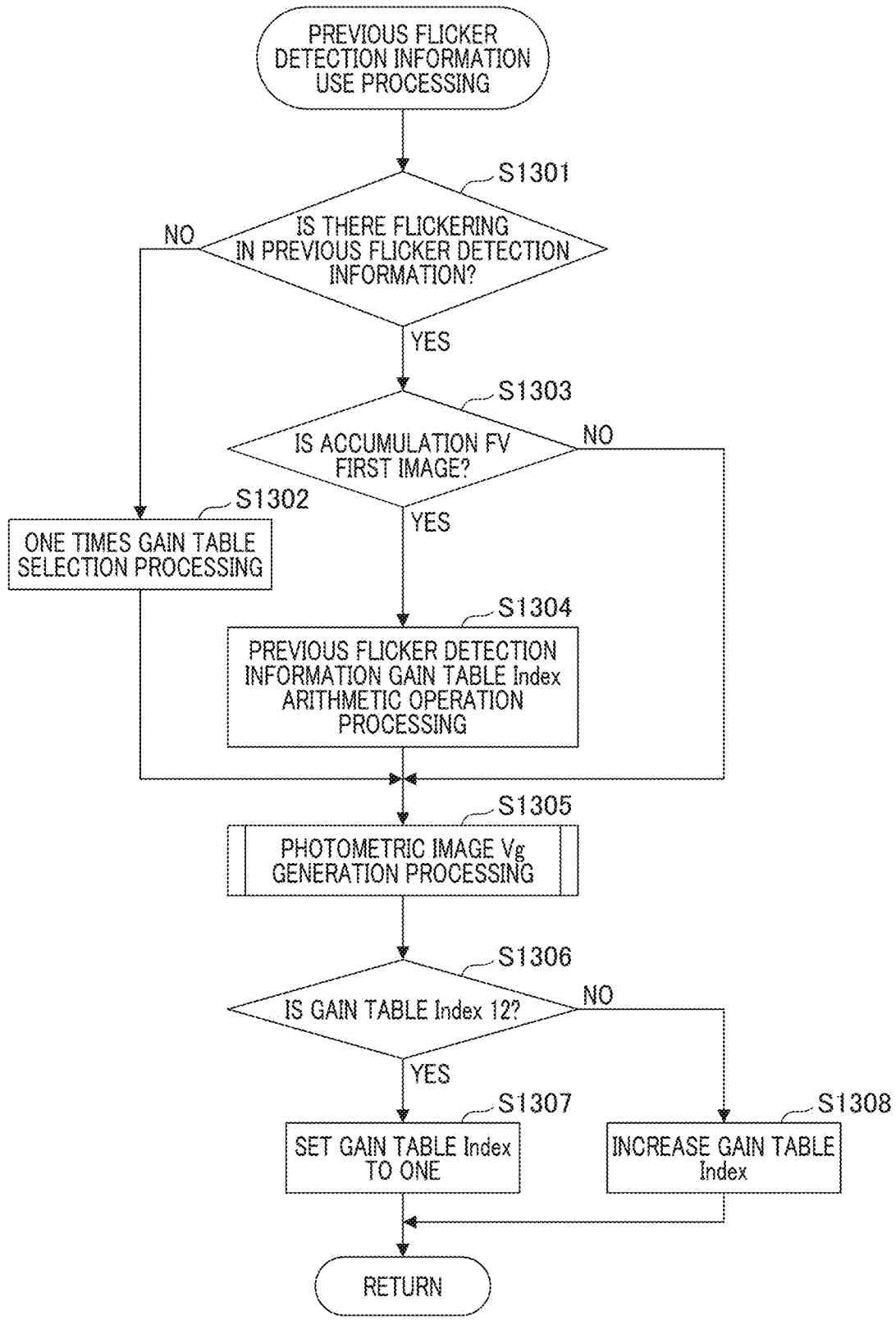
FIG. 13 is a flowchart illustrating previous flicker detection information use processing of the second embodiment.
Figure 14:
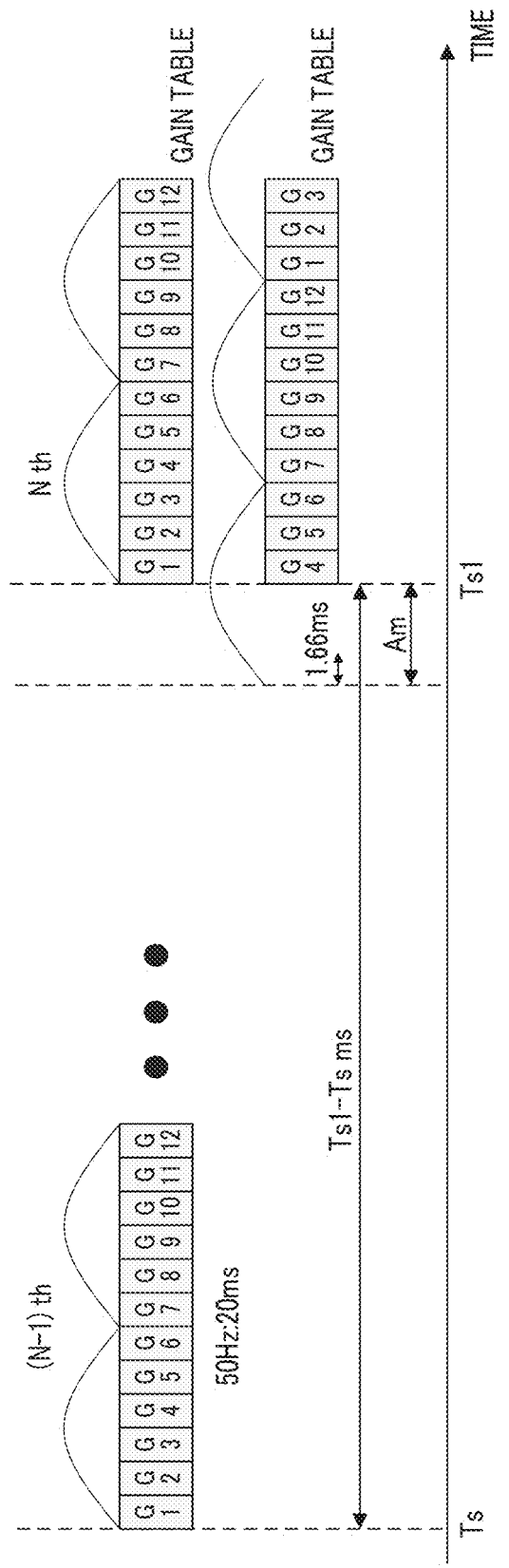
FIG. 14 is a diagram illustrating the previous flicker detection information use processing of the second embodiment.

In S1305 of FIG. 13, processing for generating a photometric image Vg is performed. A gain up circuit in the APU 112 of FIG. 1 performs gain up processing in accordance with a gain determined in S1302 and S1304 on a photometric image FV and generates data of a photometric image Vg. Next, processing for determining whether an index value of a gain table is 12 is performed in S1306. If the index value of a gain table is 12, the procedure proceeds to S1307. If the index value is not 12, the procedure proceeds to S1308. In S1307, an index of a gain table is set to one, and then the procedure returns to proceed the processing. In S1308, the index of a gain table is increased. That is, after one is added to the index value, the procedure returns to proceed the processing.

Figure 16:
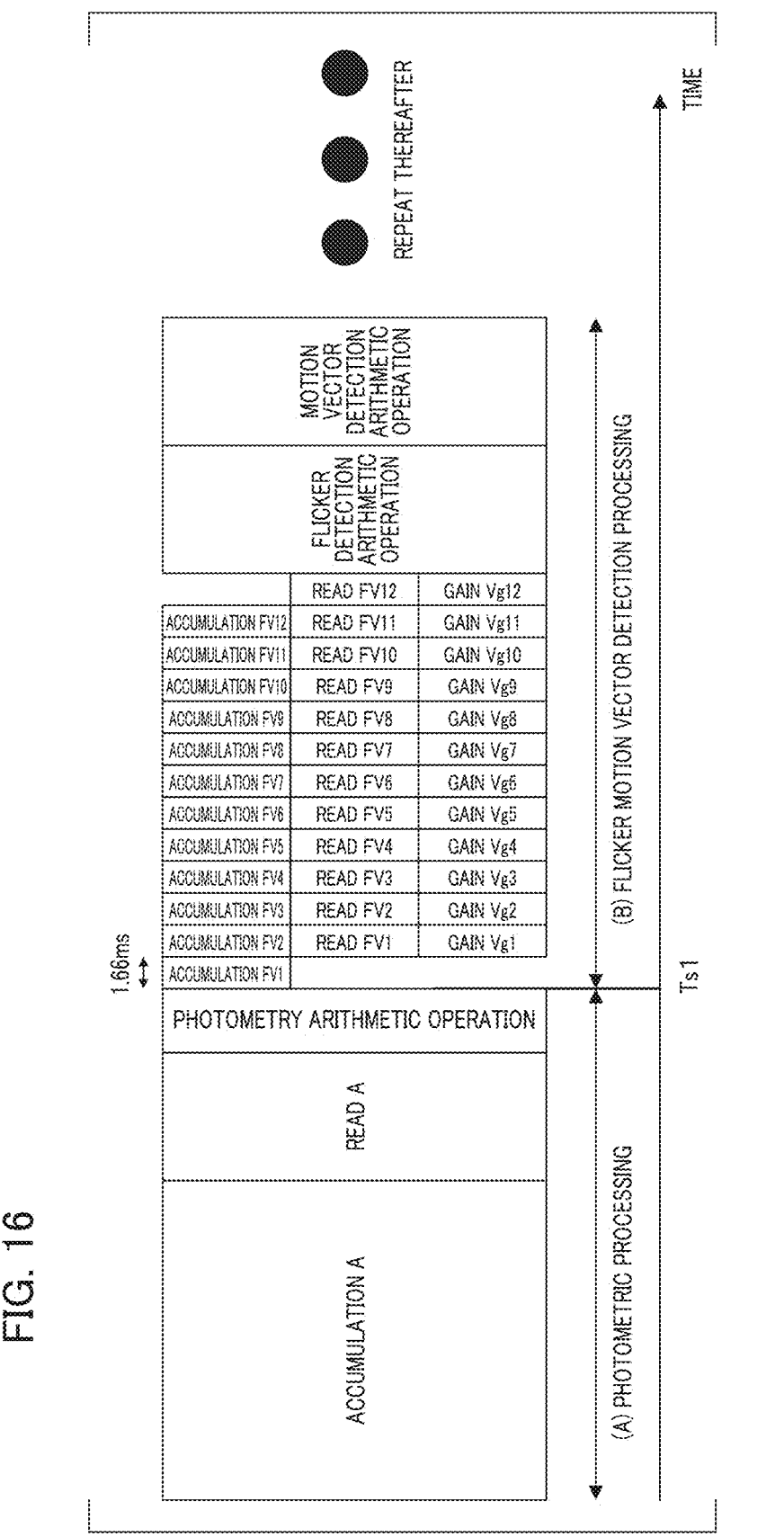
FIG. 16 is a diagram illustrating photometric flicker motion vector detection processing of the second embodiment.

FIG. 16 is a timing chart which describes a sequence of photometric processing and flicker motion vector detection processing in the present embodiment. In a period of (A) photometric processing, after accumulation A is performed at any accumulation time, read A is performed. A photometry arithmetic operation is performed using a read photometric image A. In the period of (B) flicker motion vector detection processing, the accumulation FV is continuously repeated at an accumulation time interval of 1.66 milliseconds from the accumulation start time Ts1. At this time, an accumulation FV1 ends, and at the same time a read FV1 and an accumulation FV2 are performed in parallel, and thus there is no loss in the continuity of images. Further, at the time of a read FV1, gain multiplication processing is performed by previous flicker detection information use processing described in FIG. 13 and, at the same time, a photometric image Vg1 is generated. Processing is performed on an accumulation FV2 and thereafter in the same manner, and, if generation of a read FV12 and a photometric image Vg12 ends, a flicker detection arithmetic operation is performed next. If the accumulation time is set to 1.66 milliseconds, a photometry arithmetic operation for six photometric images captured within 10 milliseconds is performed. It is possible to detect presence or absence of a flicker and a peak of the brightness of a light source by determining a change in the brightness of a photometric region. Next, it is possible to detect a peak of the brightness of a light source in the same manner from the remaining six photometric images and to determine a cycle of a flicker light source based on a time interval between the two peaks. Details thereof will be described with reference to FIGS. 17A to 17E.

Subsequently, a motion vector detection arithmetic operation is performed using 12 photometric images Vg continuously captured and multiplied by a gain. In the present embodiment, photographing is continuously performed in a short time corresponding to 1.66 milliseconds of the accumulation time of the accumulation FV. For this reason, a comparison area between a reference block and a candidate block can be reduced in size in the photometric images Vg in continuous images due to a small amount of movement of the object image including blurring. Furthermore, since a processing time is short and images having a small contrast difference are compared, it is possible to perform motion vector detection with high accuracy.

FIGS. 17A to 17E are diagrams which represent a change in brightness of the photometric image FV and the photometric image Vg during the (B) flicker motion vector detection processing period shown in FIG. 16 under a flicker light source. In a graph shown in FIG. 17A, the vertical axis represents the brightness and the horizontal axis represents a time axis. The graph shows a change in brightness under a flicker light source of 50 Hz and a peak of the brightness is expressed as EV_Fp1.

Figure 17:
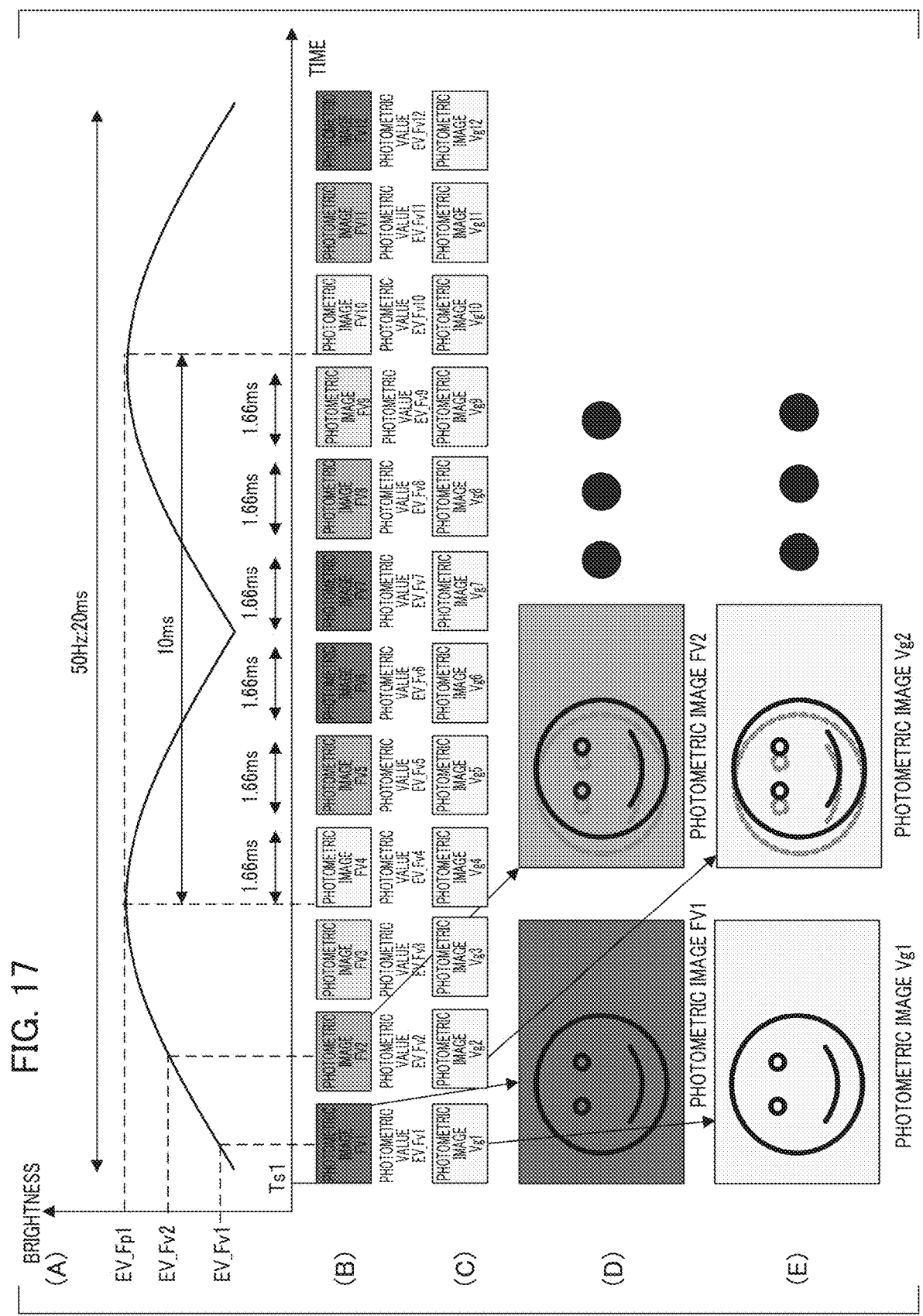
FIG. 17 is a diagram illustrating a photographing situation under a flicker light source in the second embodiment.

FIG. 17B shows continuously captured photometric images FV1 to FV12 and photometric values EV_Fv1 to EV_Fv12 by a set accumulation FV of 1.66 milliseconds and the read FV. FIG. 17B shows that there is a contrast difference in images of photometric images FV1 to FC6 continuously captured under a flicker light source. The contrast difference of these images is determined by comparing respective photometric values EV_Fv1 to EV_Fv6. In the present embodiment, it is determined that the peak EV_Fp1 of the brightness of a flicker light source is within a photometric image FV4. In the same manner, a contrast difference of the photometric images FV7 to FV12 is determined by comparing respective photometric values EV_Fv7 to EV_Fv12. It is determined that a second peak of the brightness is in a photometric image FV10. Since the accumulation time is 1.66 milliseconds and the peak of the brightness is in the photometric image FV4 and the photometric image FV10, a time difference between both images is 10 milliseconds. That is, it is known that this corresponds to a frequency of a flicker light source of 50 Hz.

FIG. 17C is a schematic diagram which shows photometric images Vg obtained by multiplying the photometric images FV1 to FV12 by a gain using previous flicker detection information use processing described in FIG. 13. Data of continuous photometric images Vg1 to Vg12, that is, image data with a small contrast difference, is generated by multiplying data of each of the photometric images FV1 to FV12 by gain.

FIG. 17D is a diagram which shows photometric images FV1 and FV2 as representative examples, and both show images including object images of a moving object. The object image in the photometric image FV1 moves to a position indicated by a solid line in the photometric image FV2 captured after 1.66 milliseconds. FIG. 17E is a diagram which shows photometric images Vg1 and Vg2 as representative examples. The object image in the photometric image Vg1 moves to a position indicated by a solid line in the photometric image Vg2 captured after 1.66 milliseconds. FIG. 17E shows that there is no contrast difference or a small contrast difference between the photometric images Vg1 and Vg2 as compared in FIG. 17D. That is, the contrast difference of each photometric image Vg is reduced by gain multiplication processing using previous flicker detection information. Therefore, it is possible to detect a motion vector of the object using a photometric image Vg whose contrast difference is reduced.

In the present embodiment, motion detection is performed at the same time as flicker detection using photometric images which are continuously captured in a short accumulation time for the flicker detection. Furthermore, it is possible to perform motion detection with high accuracy using corrected images in which a contrast difference is reduced by gain adjustment and a change in the brightness is minimized.

Third Embodiment

Next, a third embodiment of the present invention will be described. In the second embodiment, motion vector detection using an image corrected by gain multiplication is described, but there is concern that image noise may occur due to the gain multiplication. If the image noise is large, accuracy in motion detection may decrease. Therefore, in the present embodiment, processing for performing motion detection with high accuracy using flicker detection information without generating image noise under a flicker light source is described. A case in which an amplitude of the brightness of a flicker light source is larger than in a case under a flicker light source described in the above embodiments is described as an example.

FIGS. 18A to 18D are diagrams which describe a change in brightnesses of photometric images FV captured in a flicker motion vector detection processing period under a flicker light source. In a graph of FIG. 18A, the vertical axis represents brightness and the horizontal axis represents a time axis. The graph shows a change in brightness under a flicker light source of 50 Hz, and a peak of the brightness is expressed as EV_Fp1. In the present embodiment, the amplitude of the brightness of a flicker light source is large. For this reason, a photometric image FV1 is dark (the photometric value EV_Fv1 is small) and a difference between the photometric value EV_Fv1 and the peak EV_Fp1 is large.

Figure 18:
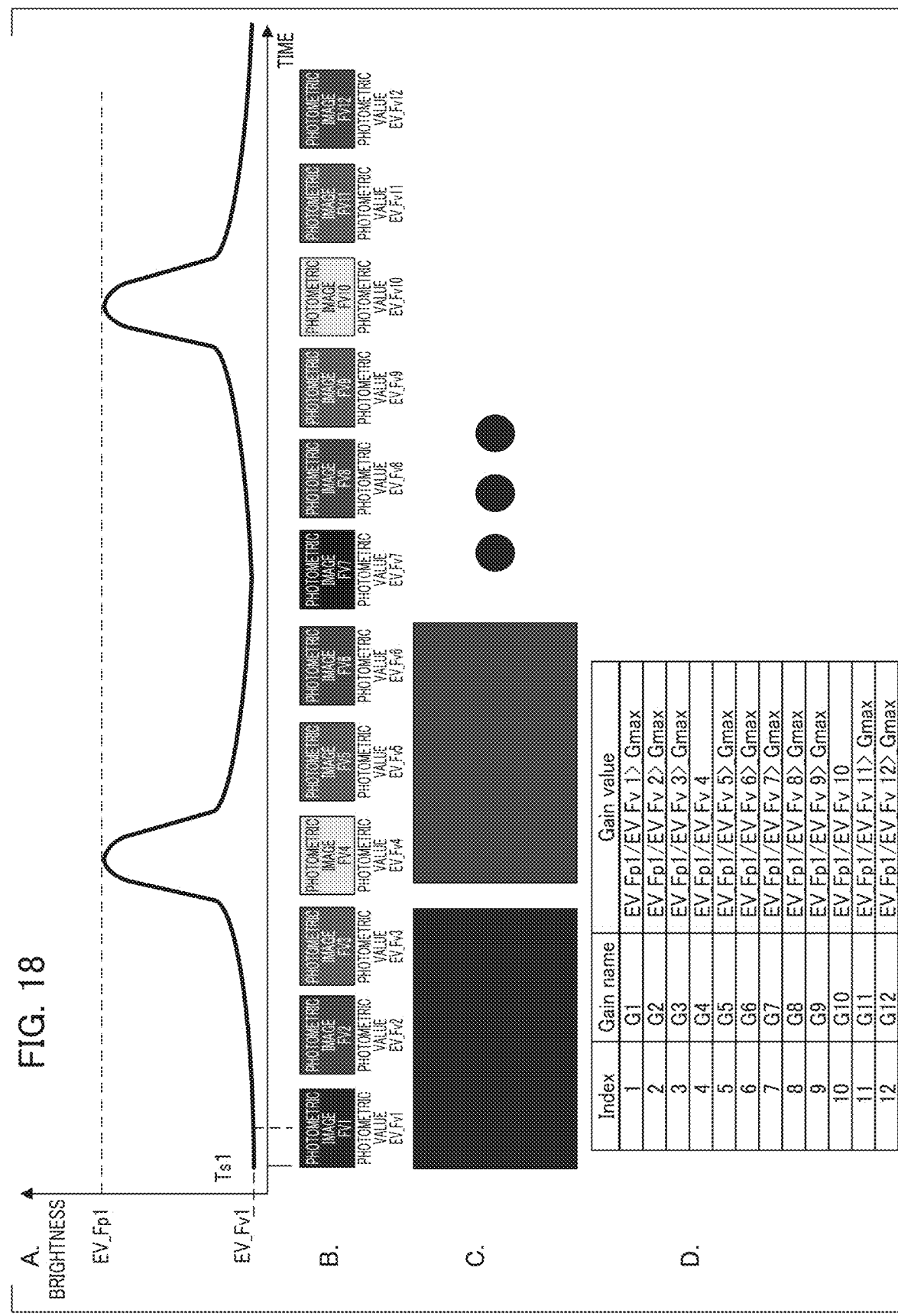
FIG. 18 is a diagram illustrating a photographing situation under a flicker light source in a third embodiment.

FIG. 18B shows the continuously captured photometric images FV1 to FV12 and the photometric values EV_Fv1 to EV_Fv12 by a set accumulation FV of 1.66 milliseconds and a read FV. There is a contrast difference in photometric images continuously captured under a flicker light source. It is determined that the peak EV_Fp1 of the brightness of a flicker light source is in a photometric image FV4 by comparing respective photometric values EV_Fv1 to EV_Fv6. In the same manner, it is determined that a second peak of the brightness is in a photometric image FV10 by comparing photometric values EV_Fv7 to EV_Fv12 of photometric images FV7 to FV12. A time difference between the photometric image FV4 and the photometric image FV10 is 10 milliseconds, that is, this corresponds to a frequency of a flicker light source of 50 Hz.

FIG. 18C is a diagram which shows a photometric images FV1 and a photometric image FV2 as representative examples, and both show an image including the object image which is the moving object. The object image in the photometric image FV1 moves in the photometric image FV2 captured after 1.66 milliseconds, but this movement may not be able to be determined or the accuracy may be significantly decreased.

FIG. 18D exemplifies a gain table of flicker detection information in these conditions. The gain table is described in the second embodiment, but a gain value is compared with a predetermined threshold value Gmax in the present embodiment. In a gain range larger than the threshold value Gmax, much noise may occur. In this embodiment, it is shown that gain values are larger than the threshold value Gmax other than for gain names G4 and G10.

Figure 19:
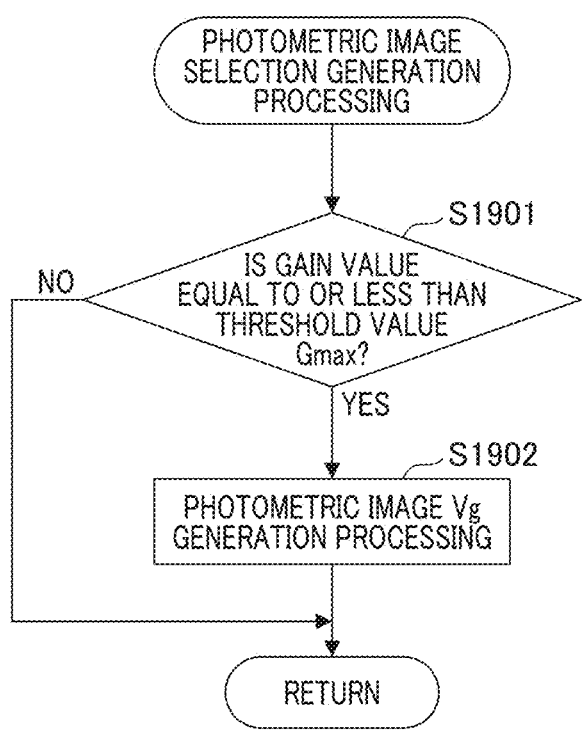
FIG. 19 is a flowchart illustrating a photometric image selection generation processing in the third embodiment.

Next, previous flicker detection information use processing in the present embodiment will be described. A difference from a flowchart of FIG. 13 is that processing of generating a photometric image Vg shown in S1305 is replaced with photometric image selection generation processing. Accordingly, the photometric image selection generation processing will be described with reference to a flowchart of FIG. 19.

S1901 is determination processing for comparing gain values acquired from a gain table index with the threshold value Gmax. If it is determined that a gain value is equal to or less than the threshold value Gmax, the procedure proceeds to S1902. In the same manner as in the second embodiment, processing of generating a photometric image Vg is executed in S1902. Then, the procedure returns to proceed the processing. On the other hand, if it is determined that an acquired gain value is larger than the threshold value Gmax, the procedure returns to proceed the processing without performing the processing of generating a photometric image Vg.

Figure 20:
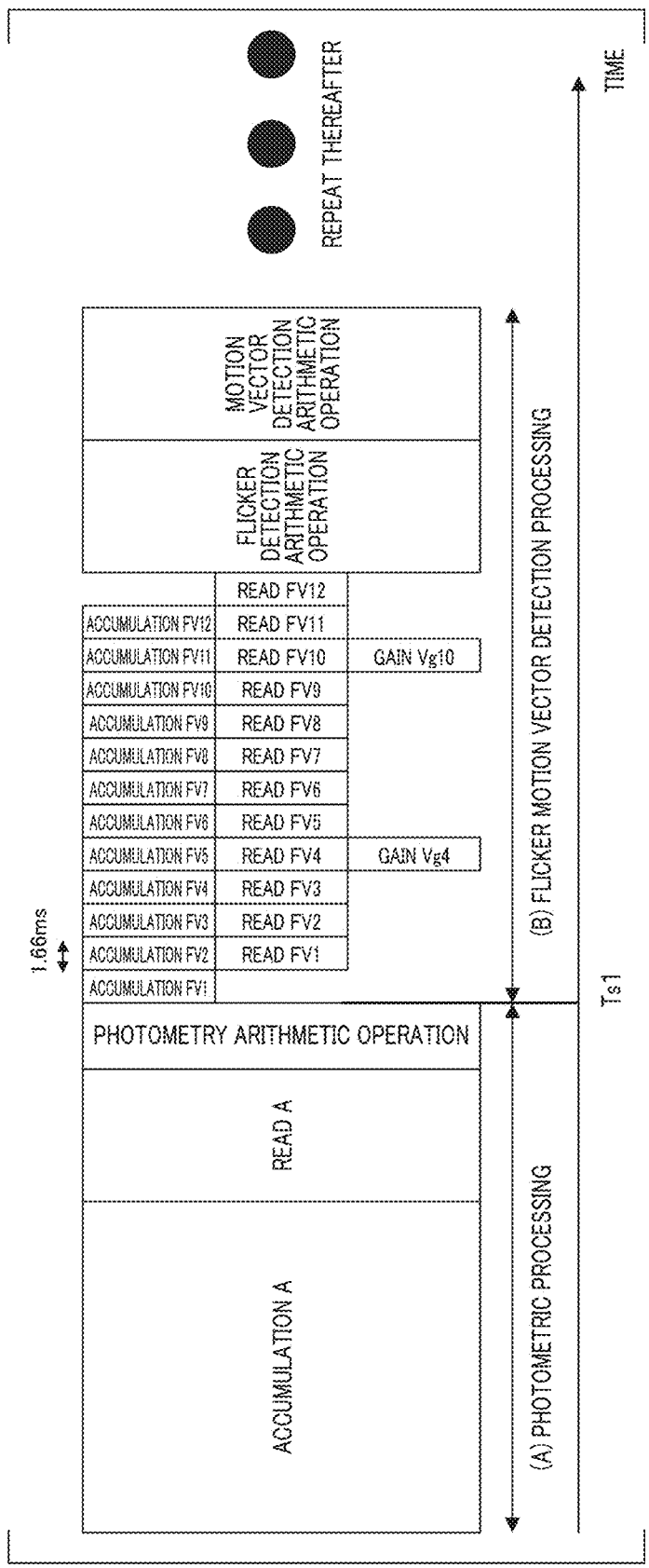
FIG. 20 is a diagram illustrating photometric flicker motion vector detection processing of the third embodiment.

FIG. 20 is a timing chart which describes a sequence of photometric processing and flicker motion vector detection processing in the present embodiment. In a period of (A) photometric processing, accumulation A is performed at any accumulation time, and then read A is performed. A photometry arithmetic operation is performed by an acquired photometric image A. Next, the accumulation FV is continuously repeated with an accumulation time interval of 1.66 milliseconds from the accumulation start time Ts1 in a period of (B) flicker motion vector detection processing. The read FV and the accumulation FV are performed side by side. Gain multiplication processing is selectively performed by previous flicker detection information use processing at the time of the read FV, and a photometric image Vg is generated at the same time.

Next, a flicker detection arithmetic operation is performed, and, in the same manner as in the above embodiments, a peak of the brightness is detected on the basis of every six photometric images and a cycle of a flicker light source is determined based on a time interval between two peaks. A motion vector detection arithmetic operation is performed using two photometric images Vg (Vg4 and Vg10 in FIG. 20) selectively generated. That is, motion detection is performed with high accuracy in an image which has less noise due to gain multiplication and less contrast difference by using the selectively acquired photometric image Vg in the present embodiment. "Selective" means to use a photometric image (corrected image) selected using a gain threshold value. According to the present embodiment, in addition to the effect of the second embodiment, motion detection is performed with high accuracy by using images having less noise under a flicker light source.

Fourth Embodiment

Figure 21:
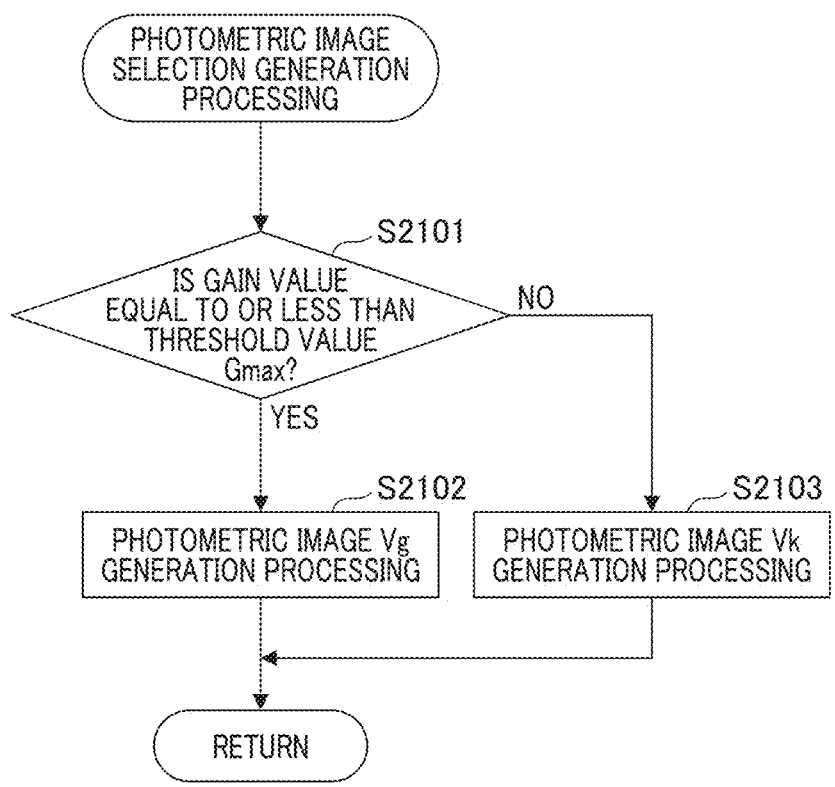
FIG. 21 is a flowchart illustrating photometric image selection generation processing in a fourth embodiment.

Next, a fourth embodiment of the present invention will be described. Photometric image selection generation processing will be described with reference to a flowchart of FIG. 21. Hereinafter, differences from the photometric image selection generation processing of the third embodiment will be mainly described. S2101 is determination processing using a threshold value in the same manner as in S1901. If it is determined that a gain value acquired from an index of a gain table is equal to or less than a threshold value Gmax, the procedure proceeds to S2102. In the same manner as in S1902, processing of generating a photometric image Vg is performed. Then, the procedure returns to proceed the processing.

In S2101, if it is determined that a gain value is larger than the threshold value Gmax, the procedure proceeds to processing of S2103. In S2103, processing of generating a photometric image Vk is performed. An addition circuit in the APU 112 of FIG. 1 adds a plurality of photometric images FV, thereby generating the photometric image Vk. The generated photometric image Vk is used for motion vector detection in conjunction with a photometric image Vg. The photometric image Vk is generated by adding a plurality of images captured at a time interval of 1.66 milliseconds. As a result, it is possible to process a dark image which originally cannot be used for motion vector detection into a bright image. Accuracy in the motion vector detection can be increased without reducing the number of samplings within a certain period of time. However, if the number of images to be added is too large, an accumulation time becomes extended and a problem of object image blurring may occur, and thus the number of images to be added is limited. In addition, if the brightness of an image is dark even if addition is performed, a gain may be modified after the addition.

Figure 22:
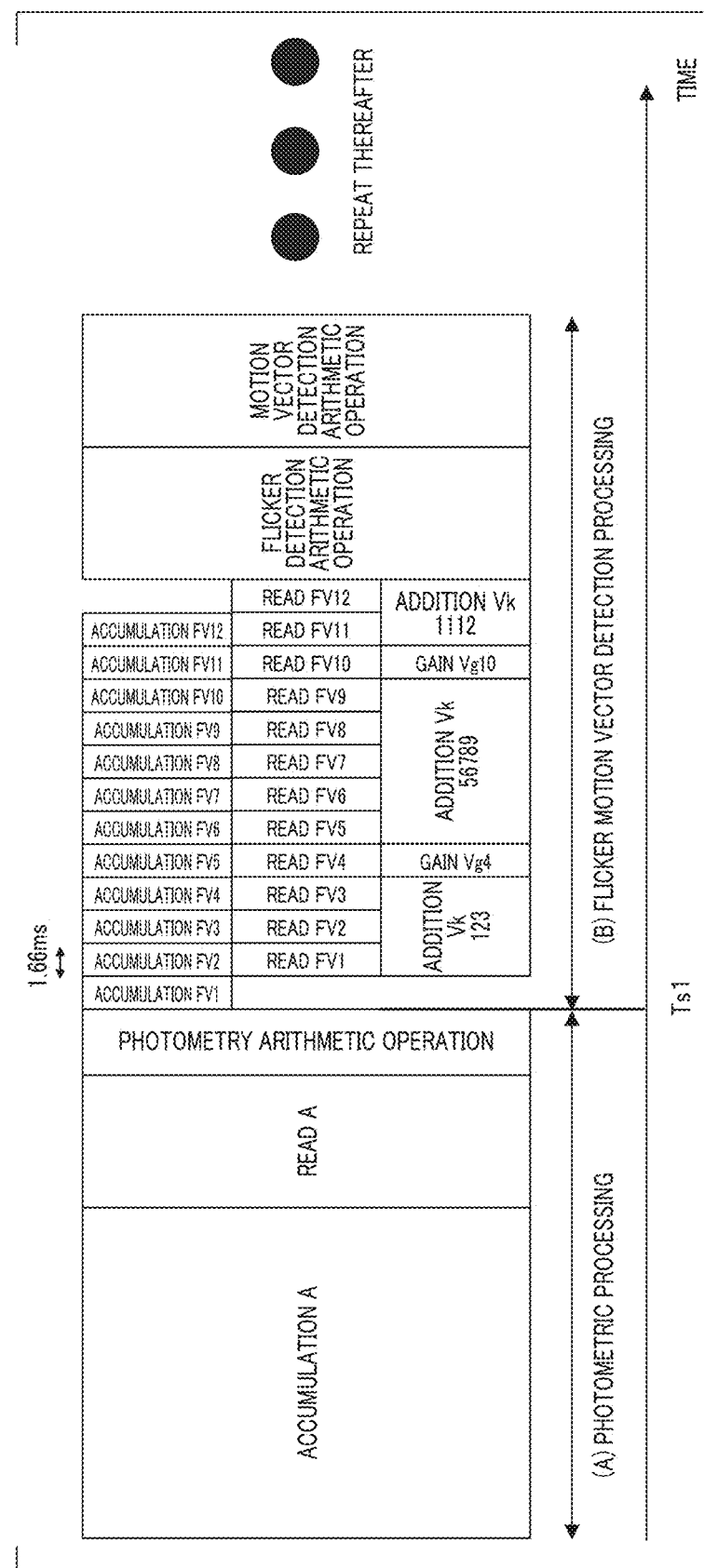
FIG. 22 is a diagram illustrating photometric flicker motion vector detection processing of the fourth embodiment.

FIG. 22 is a timing chart which describes a sequence of photometric processing and flicker motion vector detection processing in the present embodiment. In the present embodiment, addition processing is selectively performed or gain multiplication processing is performed by the photometric image selection generation processing at the time of a read FV. Accordingly, a photometric image Vk and a photometric image Vg are generated at the same time. An addition Vk 123 indicates an addition image of photometric images FV1 to FV3 and an addition Vk S6789 indicates an addition image of photometric images FV5 to FV9. An addition Vk 1112 indicates an addition image of photometric images FV11 and FV12. In addition, a gain Vg4 indicates a photometric image Vg4 and a gain Vg10 indicates a photometric image Vg10.

In the flicker detection arithmetic operation, a peak of the brightness of the flicker light source is detected, a cycle of the flicker light source is determined, and the motion vector detection arithmetic operation is performed. At this time, a motion vector of the object is detected using the generated photometric image Vk and photometric image Vg. That is, since a selectively added photometric image Vk and a photometric image Vg obtained by gain multiplication are used in the present embodiment, motion detection using an image with less noise and less contrast difference is performed.

According to the present embodiment, in addition to the effect of the above embodiments, it is possible to perform motion detection with high accuracy without reducing the number of images captured within a certain period of time by using an image with less contrast difference and less noise even under a flicker light source. In this case, the certain period of time corresponds to a period length in which a (B) flicker motion vector detection arithmetic operation is performed.

Fifth Embodiment

Next, a fifth embodiment of the present invention will be described. In the present embodiment, an image acquired by the accumulation A and the read A in the (A) photometric processing described in the first embodiment is set to be used for motion vector detection. In other words, not only images continuously captured within a short accumulation time for flicker detection but also images captured in photometric processing are further used for photometric flicker motion vector detection. Therefore, according to the present embodiment, in addition to the effect of the above embodiments, it is possible to perform motion detection with high accuracy by increasing the number of images to be used, which are captured within a certain period of time. In this case, the certain period of time corresponds to a period length in which (A) photometric processing and the (B) flicker motion vector detection arithmetic operation are performed. Preferred embodiments of the present invention has been described; however, the present invention is not limited to these embodiments, and various modifications and changes can be made within a scope of the gist of the invention. For example, in the embodiments described above, an example in which the APU 112 of the imaging apparatus performs a photometry arithmetic operation, a flicker detection arithmetic operation, a motion vector detection arithmetic operation, and the like is described. However, an image signal generated by an arithmetic operation unit of an image processing device different from the imaging apparatus for generating an image signal may be acquired, and the photometry arithmetic operation, the flicker detection arithmetic operation, the motion vector detection arithmetic operation, and the like may be performed using the acquired image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-250486, filed Dec. 26, 2016 which is hereby incorporated by reference wherein in its entirety.

What is claimed is:

1. An imaging apparatus comprising:
   an image sensor configured to image an object and acquire an image signal;
   at least one processor and at least one memory functioning as:
   a processing unit configured to perform photometric processing using the image signal; and
   a detection unit configured to perform detection of a flicker light source with cyclic changes in brightness and motion detection of the object using a plurality of image signals continuously acquired by the image sensor,
   wherein the detection unit determines presence or absence of the flicker light source by detecting a change in brightness of an image and calculates a motion amount of the object,
   wherein the processing unit performs the photometric processing using the image signal imaged and read by the image sensor at a first exposure time,
   wherein the detection unit performs the detection of the flicker light source and the motion detection of the object using the image signal imaged and read by the image sensor at a second exposure time which is shorter than the first exposure time, and
   wherein the image used for the detection of the flicker light source is used for the motion detection of the object.

2. The imaging apparatus according to claim 1,
   wherein the first exposure time is an accumulation time of the image signal used to measure the brightness of the image in the photometric processing, and
   wherein the second exposure time is accumulation time of the image signal when a predetermined number of images are acquired for the change in the brightness of the flicker light source.

3. The imaging apparatus according to claim 1,
   wherein the detection unit detects a peak of the brightness of the flicker light source and calculates a cycle.

4. The imaging apparatus according to claim 1,
   wherein the at least one processor and the at least one memory further function as a correction unit configured to correct the brightness of the image according to the image signal if the detection unit determines that there is the flicker light source,
   wherein the detection unit calculates a motion vector of the object using the plurality of image signals corrected by the correction unit.

5. The imaging apparatus according to claim 4,
   wherein the correction unit generates the image whose brightness is corrected using flicker detection information previously obtained by the detection unit.

6. The imaging apparatus according to claim 5,
   wherein the correction unit performs processing to determine a gain corresponding to the change in the brightness of the flicker light source and to multiply the plurality of image signals by the gain.

7. The imaging apparatus according to claim 6,
   wherein the flicker detection information includes one or more of accumulation start time of the image sensor, information indicating presence or absence of the flicker light source, information indicating the peak of the brightness of the flicker light source, and information of the gain.

8. The imaging apparatus according to claim 4,
   wherein the detection unit calculates the motion vector using the image signal selected from the plurality of corrected image signals if the detection unit determines that there is the flicker light source.

9. The imaging apparatus according to claim 4,
   wherein the detection unit calculates the motion vector of the object using the corrected image signal corresponding to the peak of the brightness of the flicker light source if the detection unit determines that there is the flicker light source.

10. The imaging apparatus according to claim 5,
wherein the correction unit determines the gain corresponding to the change in the brightness of the flicker light source, and the correction unit performs the processing for adding the plurality of image signals continuously acquired if the gain is larger than a threshold value.

11. The imaging apparatus according to claim 6,
wherein the correction unit performs correction of the image signal if the determination unit determines that there is the flicker light source and the gain is less than a threshold value.

12. The imaging apparatus according to claim 1,
wherein the detection unit calculates the motion amount of the object using the image signal acquired by the photometric processing and the plurality of image signals continuously acquired by the image sensor.

13. A control method executed by an imaging apparatus including an image sensor that images an object, the method comprising:

performing photometric processing using an image signal acquired by the image sensor; and determining presence or absence of a flicker light source with cyclic changes in brightness by detecting a change in brightness of an image in the detecting; and calculating a motion amount of the object using a plurality of image signals continuously acquired by the image sensor, wherein the image signal imaged and read by the image sensor at a first exposure time is used for the performing, wherein the image signal imaged and read by the image sensor at a second exposure time which is shorter than the first exposure time is used for the determining and the calculating, and wherein the image used for the detection of the flicker light source is used for the motion detection of the object.

* * * * *